United States Patent
Boudia et al.

(10) Patent No.: US 12,425,386 B2
(45) Date of Patent: Sep. 23, 2025

(54) CROSS PLATFORM ACCOUNT UNIFICATION AND NORMALIZATION

(71) Applicant: AMADEUS S.A.S., Biot (FR)

(72) Inventors: Mourad Boudia, Valbonne (FR); Nicolas Hauviller, Valbonne (FR); Rodolphe Texier, Vallauris (FR); Bilel Ben Romdhanne, Opio (FR); Fatih Donmez, Berlin (DE)

(73) Assignee: AMADEUS S.A.S., Biot (FR)

( * ) Notice: Subject to any disclaimer, the term of this patent is extended or adjusted under 35 U.S.C. 154(b) by 127 days.

(21) Appl. No.: 18/134,859

(22) Filed: Apr. 14, 2023

(65) Prior Publication Data

US 2024/0195793 A1 Jun. 13, 2024

(30) Foreign Application Priority Data

Dec. 8, 2022 (EP) .................................. 22315318

(51) Int. Cl.
*H04L 9/40* (2022.01)
*G06N 7/01* (2023.01)
(Continued)

(52) U.S. Cl.
CPC ........... *H04L 63/0815* (2013.01); *G06N 7/01* (2023.01); *G06Q 30/02* (2013.01);
(Continued)

(58) Field of Classification Search
CPC ..... G06T 19/00; G06T 19/20; H04N 21/2353; H04N 19/169
See application file for complete search history.

(56) References Cited

U.S. PATENT DOCUMENTS 11,785,299 B1 10/2023 Wanjari et al.
12,175,603 B2 * 12/2024 Cross ...................... G06T 19/20
(Continued)

FOREIGN PATENT DOCUMENTS

EP 0949596 A2 10/1999
JP 2021047571 A 3/2021
(Continued)

OTHER PUBLICATIONS

Coinbase, "Understanding the order types", help.coinbase.com, 2023, Retrieved from the Wayback Machine on Oct. 8, 2024 from URL: https://web.archive.org/web/20230531010333/https:/help.coinbase.com/en/coinbase/trading-and-funding/advanced-trade/order-types.

(Continued)

*Primary Examiner* — Barbara B Anyan
(74) *Attorney, Agent, or Firm* — Perry + Currier Inc.

(57) ABSTRACT

The present specification provides a multiplatform virtual retail store engine. The specification can have application to client devices with augmented or virtual reality hardware that interact with different platforms with metaverse capabilities. Rich experiences are provided on client hardware while making efficient use of available processing, memory and communication resources. Embodiments discuss the provision of a single retail store model which is dynamically adapted for generation across the plurality of different platforms according to the different metaverse capabilities. Embodiments also discuss include racking of the same user across different accounts on different metaverse platforms.

8 Claims, 24 Drawing Sheets

(51) Int. Cl.
  *G06Q 30/02* (2023.01)
  *G06Q 30/0241* (2023.01)
  *G06Q 50/00* (2012.01)
  *G06T 19/00* (2011.01)
  *G06T 19/20* (2011.01)

(52) U.S. Cl.
  CPC ......... *G06Q 30/0276* (2013.01); *G06Q 50/01* (2013.01); *G06T 19/00* (2013.01); *G06T 19/20* (2013.01)

(56) References Cited

U.S. PATENT DOCUMENTS

| | | | |
|---|---|---|---|
| 2002/0154174 | A1 | 10/2002 | Redlich et al. |
| 2003/0097428 | A1 | 5/2003 | Afkhami et al. |
| 2005/0027870 | A1 | 2/2005 | Trebes, Jr. |
| 2009/0063491 | A1 | 3/2009 | Barclay et al. |
| 2010/0017283 | A1 | 1/2010 | Hamilton, II et al. |
| 2010/0100828 | A1 | 4/2010 | Khandelwal et al. |
| 2013/0036139 | A1 | 2/2013 | Kung et al. |
| 2013/0117351 | A1 | 5/2013 | Zoheir et al. |
| 2013/0226758 | A1* | 8/2013 | Reitan ............. G06Q 30/02 705/35 |
| 2013/0249948 | A1* | 9/2013 | Reitan ............. G06T 19/00 345/633 |
| 2014/0063061 | A1* | 3/2014 | Reitan ............. G09G 5/14 345/633 |
| 2014/0281850 | A1 | 9/2014 | Prakash et al. |
| 2014/0289241 | A1 | 9/2014 | Anderson |
| 2015/0379046 | A1 | 12/2015 | Sundaresan et al. |
| 2016/0148192 | A1 | 5/2016 | Storonsky |
| 2016/0255327 | A1 | 9/2016 | Cole et al. |
| 2016/0316243 | A1 | 10/2016 | Park et al. |
| 2016/0379265 | A1 | 12/2016 | Jagota et al. |
| 2017/0064512 | A1 | 3/2017 | Silverberg et al. |
| 2017/0083626 | A1 | 3/2017 | Kensel et al. |
| 2017/0286539 | A1 | 10/2017 | Smith et al. |
| 2017/0310786 | A1 | 10/2017 | Collier et al. |
| 2017/0316608 | A1 | 11/2017 | Khalid et al. |
| 2017/0339020 | A1 | 11/2017 | Khanna |
| 2018/0046944 | A1 | 2/2018 | Barbera et al. |
| 2018/0088749 | A1 | 3/2018 | Yamshita et al. |
| 2018/0167483 | A1 | 6/2018 | Cannon et al. |
| 2018/0302489 | A1 | 10/2018 | Harikumar et al. |
| 2019/0012822 | A1* | 1/2019 | Seigneurbieux .... G06F 3/04815 |
| 2019/0036864 | A1 | 1/2019 | Reuss |
| 2019/0073832 | A1 | 3/2019 | Kim |
| 2019/0139321 | A1 | 5/2019 | Kocharlakota et al. |
| 2019/0215373 | A1 | 7/2019 | Mathur et al. |
| 2019/0244237 | A1 | 8/2019 | Magnuson, Jr. et al. |
| 2019/0318403 | A1 | 10/2019 | Schulz et al. |
| 2019/0321725 | A1 | 10/2019 | Zimring et al. |
| 2019/0370492 | A1 | 12/2019 | Falchuk et al. |
| 2020/0230499 | A1 | 7/2020 | Buser et al. |
| 2020/0320795 | A1 | 10/2020 | Dubnov et al. |
| 2021/0004733 | A1 | 1/2021 | Badua et al. |
| 2021/0049714 | A1 | 2/2021 | Shaaban et al. |
| 2021/0303776 | A1 | 9/2021 | Morrow |
| 2021/0342754 | A1 | 11/2021 | Baalbergen |
| 2021/0383430 | A1 | 12/2021 | Chijimatsu et al. |
| 2022/0053222 | A1* | 2/2022 | Sonneveldt .......... H04N 19/169 |
| 2022/0089237 | A1 | 3/2022 | Sverdlov et al. |
| 2022/0132214 | A1 | 4/2022 | Felman |
| 2022/0182430 | A1 | 6/2022 | Bennett-James et al. |
| 2022/0239949 | A1* | 7/2022 | Hannuksela ....... H04N 21/2353 |
| 2022/0242450 | A1 | 8/2022 | Sokolov et al. |
| 2023/0016490 | A1 | 1/2023 | Berkebile |
| 2023/0298008 | A1 | 9/2023 | Sarin |
| 2024/0070653 | A1* | 2/2024 | Cho ...................... G06F 21/64 |
| 2024/0144571 | A1 | 5/2024 | Zavesky et al. |
| 2024/0160272 | A1 | 5/2024 | Soryal et al. |
| 2024/0185190 | A1 | 6/2024 | Ranjan et al. |
| 2024/0232884 | A1 | 7/2024 | Jayaraman |
| 2024/0257111 | A1 | 8/2024 | Bimolaksono et al. |
| 2024/0289756 | A1 | 8/2024 | Bimolaksono et al. |

FOREIGN PATENT DOCUMENTS

| | | |
|---|---|---|
| KR | 102412142 B1 | 6/2022 |
| WO | WO-2021178630 A1 | 9/2021 |
| WO | WO-2022150486 A1 | 7/2022 |

OTHER PUBLICATIONS

Chen, Bohan, et al. "A cross-platform metaverse data management system." 2022 IEEE International Conference on Metrology for Extended Reality, Artificial Intelligence and Neural Engineering (MetroXRAINE). IEEE, 2022.

Steam, "Steam Community Market." SteamCommunity.com, date unknown, Retrieved from the Internet on Jul. 12, 2023 from URL: steamcommunity.com/market/.

Steam, "Steam Community Market ?: Listings for Playerunknown Set." Steam.Community.com, date unknown, Retrieved from the Internet on Jul. 14, 2023 from URL: https://steamcommunity.com/market/listings/578080/PLAYERUNKNOWN%20SET. Accessed Jul. 14, 2023.

U.S. Appl. No. 18/134,663, Multi-Platform Content Normalization Engine, filed Apr. 14, 2023.

U.S. Appl. No. 18/134,765, Multi-Platform Virtual Retail Store Engine, Apr. 14, 2023.

U.S. Appl. No. 18/134,817, System and Method for Normalization of Electronic Message Content Representing Pricing Across Different Platforms, filed Apr. 14, 2023.

U.S. Appl. No. 18/215,361, Context Based Computing Resource Intermediation Engine, filed Jun. 28, 2023.

Berki, Borbála. "2d advertising in 3d virtual spaces." Acta Polytechnica Hungarica 15.3 (2018): 175-190.

Minecraftwiki, "Tutorials/Creating shapes", Fandom.com, Nov. 4, 2022, Available from the WaybackMachine at URL: https://web.archive.org/web/20221104165330/https://minecraft.fandom.com/wiki/Tutorials/Creating_shapes.

U.S. Appl. No. 18/134,765, Multi-Platform Virtual Retail Store Engine, filed Apr. 14, 2023.

U.S. Appl. No. 18/134,817, System and Method for Normalization of Electronic Representing Pricing Across Different Platforms, filed Apr. 14, 2023.

U.S. Appl. No. 18/767,324, A Device, System, and Method for Implementing a Computing Resource Optimization Engine, filed Jul. 9, 2024.

U.S. Appl. No. 18/120,085, Computing and Transportation Resource Optimization Engine, filed Mar. 10, 2023.

U.S. Appl. No. 18/792,746, A Device, System, and Method for Controlling Memory Usage Associated With an Intermediation Engine for a Virtual Platform, filed Aug. 2, 2024.

* cited by examiner

FIG. 8

| Capability requested to support the full scenario | Platform 104a-1 | Platform 104a-2 | Platform 104a-3 | Platform 104a-4 | Platform 104a-n |
|---|---|---|---|---|---|
| CAPABILITY_01 Support the addition, removal and update of 3D Metaverse assets (buildings) from 3rd party application | Support: Y Fallback: N/A | Support: Y Fallback: N/A | Support: Y Fallback: N/A | Support: N Fallback: Push 3D assets to a queue, managed by a human bring to update manually assets | Support: Y Fallback: N/A |
| CAPABILITY_02 Support the addition, removal and update of 3D Metaverse assets (buildings) with animations from 3rd party application | Support: Y Fallback: N/A | Support: N Fallback: Animation removed from 3D Scene Description (with default state) | Support: N Fallback: Animation removed from 3D Scene Description (with default state) | Support: Y Fallback: N/A | Support: Y Fallback: N/A |
| CAPABILITY_03 | | | | | |
| ... | | | | | |

CROSS PLATFORM ACCOUNT UNIFICATION AND NORMALIZATION

CROSS-REFERENCE TO RELATED APPLICATION(S)

This application claims the benefit of European Patent Application No. 22315318.0, filed Dec. 8, 2022, entitled "CROSS PLATFORM ACCOUNT UNIFICATION AND NORMALIZATION"; the entire contents of which are incorporated herein by reference.

BACKGROUND

Internet browsing began with the original hypertext markup language (HTML). HTML has iterated to its fifth version and continues to evolve. Elegant web browsing experiences are now commonplace, even on wireless mobile phones with small screens. With the correct equipment, augmented reality and virtual reality environments (commonly referred to as the metaverse), are on the cusp of providing even richer experiences than offered by traditional browsing. Standard Internet speeds now offer commonplace real time communication amongst large groups of people. At the same time, Internet content is increasing in volume and changing rapidly. Enormous unresolved challenges are present in efficiently utilizing computing, processing and communication resources.

SUMMARY

Aspects of the invention are set out in the independent claims and preferred features are set out in the dependent claims. Features of one aspect may be applied to each aspect alone or in combination with other aspects.

An aspect of the present specification provides a matching engine comprising:
  a network interface; and
  a processor configured to:
    compare first metaverse metadata associated with a first account of a first metaverse and second metaverse metadata associated with a second account of a second metaverse;
    the first metaverse metadata comprising at least one of: first user data; first connection times that a first metaverse human-machine interface (HMI) associated with the first user connected to the first metaverse; first disconnection times that a first metaverse HMI associated with the first user disconnected from the first metaverse and time duration of activity by the first user with respect to the first metaverse;
    the second metaverse metadata comprising at least one of: second user data; second connection times that a second metaverse HMI associated with the second user was connected to the second metaverse; and
    in response to determining, from the first metaverse metadata and the second metaverse metadata, that the first user and the second user is a same user:
      when the first metaverse HMI is connected to the first metaverse, adapt, via the network interface, first behavior of the first metaverse based on the second metaverse metadata to control first physical feedback of the first metaverse HMI to indicate the first behavior; and
      when the first metaverse HMI is connected to the second metaverse, adapt, via the network interface, second behavior of the second metaverse based on the first metaverse metadata, to control second physical feedback of the second metaverse HMI to indicate the second behavior.

The processor can be further configured to receive, via the network interface, the first metaverse metadata and the second metaverse metadata.

The network interface can be configured to:
  receive the first metaverse metadata from first sensors associated with the first metaverse; and,
  receive the second metaverse metadata from second sensors associated with the second metaverse.

The first user data and the second user data can comprise one or more of:
  non-fungible token (NFT) information identifying respective NFTs associated with one or more of the first metaverse and the second metaverse;
  avatar information identifying respective avatars associated with one or more of the first metaverse and the second metaverse; and
  behavior information identifying respective avatar behavior associated with one or more of the first metaverse and the second metaverse.

The processor can be further configured to determine, from the first metaverse metadata and the second metaverse metadata, that the first user and the second user is the same user by:
  determining that the first user data and the second user data include given commonalities therebetween; and
  determining that the first connection times and the second connection times are different from one another.

The processor can be further configured to determine, from the first metaverse metadata and the second metaverse metadata, that the first user and the second user is the same user by:
  determining that a probability that the first user data and the second user data are associated;
  determining that the probability meets a threshold condition; and
  determining that the first connection times and the second connection times are different from one another.

The processor can be further configured to:
  determine that the first connection times and the second connection times at least partially overlap; and, in response,
  electronically initiate a corrective action.

The processor can be further configured to: in response to determining that the first user and the second user is a same user, one or more of:
  transmit one or more messages to a communication device associated with the same user;
  store the first user data in association with the second metaverse;
  store the second user data in association with the first metaverse; and
  update information associated with the same user based on one or more of the first user data and the second user data.

The processor can be further configured to:
  in response to determining that the same user is logged into the first metaverse using first metaverse credentials and teleports to the second metaverse using second metaverse credentials, provide the first user data to the second metaverse; and
  in response to determining that the same user is logged into the second metaverse using the second metaverse credentials and teleports to the first metaverse using the first metaverse credentials, provide the second user data to the first metaverse.

Another aspect of the present specification provides a method for cross platform account unification comprising:
receiving an identifier for each of a plurality of platforms; at least one of the platforms configured to generate an interactive metaverse;
receiving metadata for at least one user account for each of the platforms;
comparing the metadata for each of the accounts;
determining that at least two of the accounts match with a single user;
associating the at least two of the accounts with a unified account; and,
controlling at least one of the platforms based on the unified account.

The metadata can be inferred from behavioural information from the pattern of usage of input devices by the user at a client device used to control an avatar in the interactive metaverse.

The metadata can be derived from non-fungible token (NFT) information identifying respective NFTs associated with the at least one user account.

The metadata can be derived from declarative data identifying the user.

The metadata can be derived from alternating connection times of each platform.

The match can be based on a probability threshold. The probability threshold can be derived from a machine learning algorithm that receives positive confirmation from a plurality of the single users of a correct match and then applies the probability threshold to additional single users without positive confirmation. If the probability threshold is less than one hundred percent the controlling is limited to generating interactive metaverse advertisements.

The controlling can comprise generating an interactive metaverse advertisement on one of the platforms directed the single user based on actions performed by the single user an another one of the platforms.

The controlling can comprise providing travel services including a single travel sales transaction of one or more of marketing, sales, travel option selections across two of the platforms.

The controlling can comprise automatically providing authentication credentials to one of the platforms when the single user switches from another one of the platforms.

Another aspect of the present specification provides an adaptation engine comprising:
a network interface configured to communicate with a platform server configured to provide a metaverse space; and
a processor configured to:
access a memory storing a metaverse model to be provided in the metaverse space;
access criteria for providing metaverse objects in the metaverse space;
determine incompatibilities between objects of the model and the criteria;
for a given object of the model associated with an incompatibility:
implement one or more substitutions to replace the given object with a corresponding object adapted according to the criteria;
update, at the memory, the model to replace the given object with the corresponding object; and
provide the updated to the metaverse server to cause the metaverse server to generate the metaverse model in the metaverse space according to the updated model such that the metaverse server is configured to control output at a metaverse human-machine interface (HMI) to according to the corresponding object.

Another aspect of the specification provides a method to communicate with a platform server configured to provide a metaverse space comprising:
accessing a memory storing a metaverse model to be provided in the metaverse space;
accessing criteria for providing metaverse objects in the metaverse space;
determining incompatibilities between objects of the model and the criteria;
for a given object of the model associated with an incompatibility:
implement one or more substitutions to replace the given object with a corresponding object adapted according to the criteria;
update, at the memory, the model to replace the given object with the corresponding object; and
providing the updated to the metaverse server to cause the metaverse server to generate the metaverse model in the metaverse space according to the updated model such that the metaverse server is configured to control output at a metaverse human-machine interface (HMI) to according to the corresponding object.

Another aspect of the present specification provides an adaptation engine comprising a network interface configured to communicate with a platform server. The platform server is configured to provide a session with a client device. The adaptation engine includes a processor having access to a memory for storing content for rendering over the session. The processor is configured to: receive a request for content to be delivered to the client device from the platform server; determine a platform server computing resource capability; determine a client device computing resource capability; define a session computing resource capability for the session based on the platform server computing resource capability and the client device computing resource capability; access, from the memory, essential content respective to the request; access, from the memory, additional content augmenting the essential content, based on the session computing resource capability; and, generate a response to the request based on the essential content and the additional content.

Another aspect of the specification provides a device comprising: a network interface configured to communicate with a metaverse server configured to provide a given metaverse space; and a processor having access to a memory storing metaverse items for rendering in one or more metaverse spaces, the processor configured to:
determine metaverse capability data for the given metaverse space;
determine human-machine interface (HMI) data defining capability of a metaverse HMI for a given user and limits placed on the metaverse HMI to account for accessibility of the given user;
determine that the given metaverse space is being accessed by the given user using the metaverse HMI;
one or more of filter and adapt one or more of the metaverse items based on the metaverse capability data and the HMI data; and
provide the metaverse items, as filtered or adapted, to the metaverse server to cause the metaverse server to provide the metaverse items in the given metaverse space to cause physical feedback to the metaverse HMI to indicate the metaverse items, as filtered or adapted.

Methods, systems and devices and apparatus according to any combination or variant of the foregoing are contemplated. In particular, apparatus comprising means to implement each of the steps set out in the methods described above or in the accompanying claims are contemplated. Moreover, also contemplated is a computer program, computer program product or computer readable medium comprising instructions which, when executed by a computer, cause the computer to carry out the steps of any of the methods set out above or in any of the accompanying method claims.

BRIEF DESCRIPTION OF THE FIGURES

FIG. 8 shows an example of a non-rich rendering of an airline seat selection map that can be selected during a session between a client device and a given platform having fewer capabilities than the session represented in FIG. 5.

FIG. 15 shows a criteria chart of capabilities of various platforms of FIG. 9.

DETAILED DESCRIPTION

Figure 1:
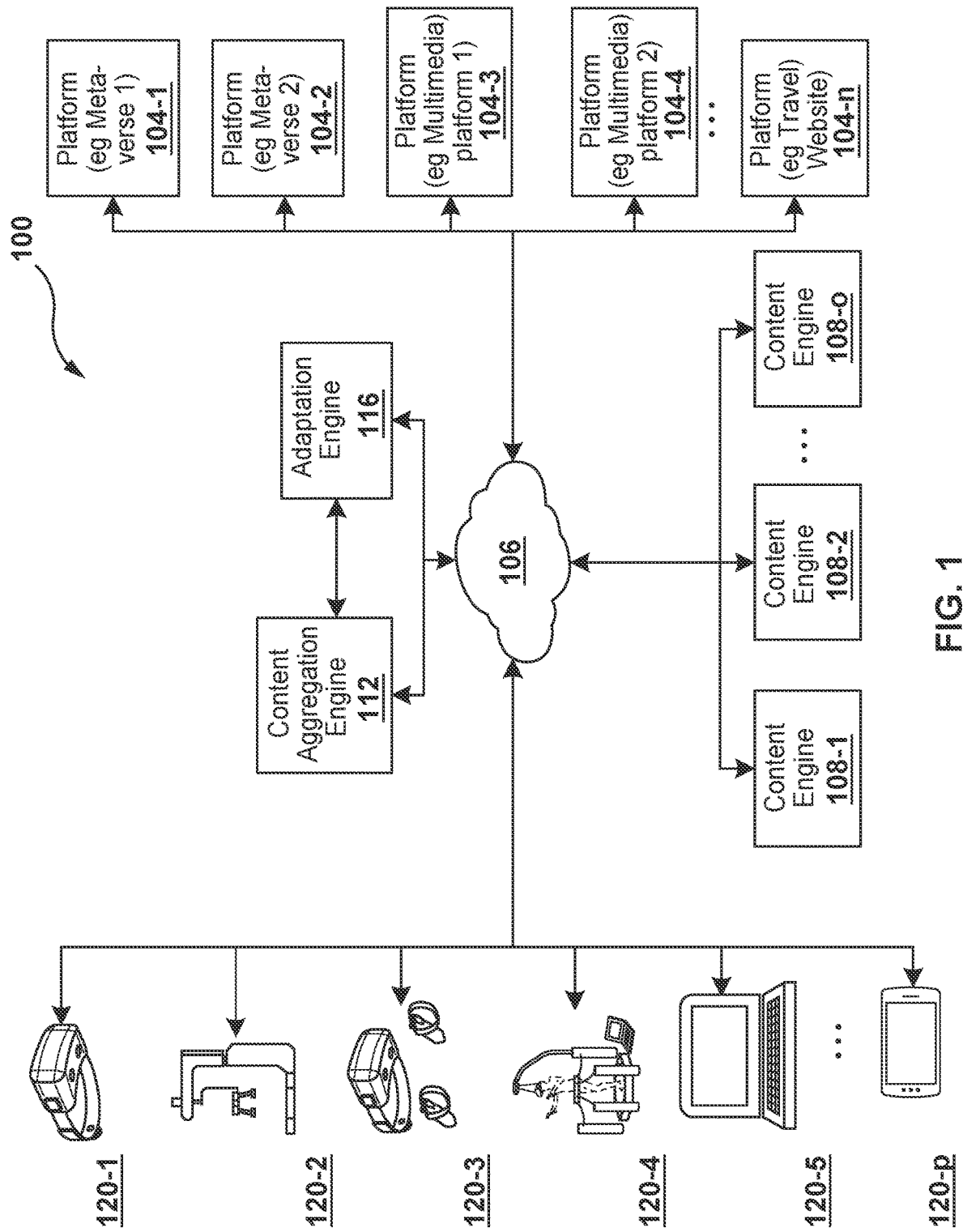
FIG. 1 is a schematic diagram of a system for multi-platform content normalization.

FIG. 1 shows a system for multi-platform content normalization indicated generally at 100. System 100 comprises a plurality of interaction platforms 104 104-1, 104-2 . . . 104-n. (Collectively, platforms 104-1, 104-2 . . . 104-n are referred to as platforms 104, and generically, as platform 104. This nomenclature is used elsewhere herein.) Platforms 104 can be based on any present or future interactive communication platforms such as a simple messaging service (SMS) interactive service, a browser-based e-commerce travel booking environment such as Travelocity™, Expedia™ or any of the individual airline or hotel booking engines. Interactive communication platforms also include social media environments like Facebook™, Tiktok™, or even communication channel such as Whatsapp™, or a massively multi-player environment such as Second Life™, MineCraft™, Fortnite™, or a virtual reality 3D metaverse environment such as Roblox™ or Horizon Worlds™. Certain non-limiting examples for each platform 104 are labelled in FIG. 1 for purpose of discussion. Namely, platform 104-1 is labelled with the example "Metaverse 1" (such as Roblox™ or Horizon Worlds™); platform 104-2 is labelled with the example "Metaverse 2"; platform 104-3 is labelled with the example "Multimedia Platform 1" (such as Second Life™); platform 104-4 is labelled with the "Multimedia Platform 2" (such as Expedia™); platform 104-n is labelled with the "Travel Website"; These examples are nonlimiting and purely illustrative. Other platforms and combinations thereof are contemplated.

In system 100, platforms 104 connect to a network 106. Any network topology is contemplated, such as, by way of non-limiting example, the Internet, one or more intranets, or combinations thereof. Network 106 interconnects platforms 104, with: a) at least one content engine 108; b) at least one content aggregation engine 112 that is coupled with a platform adaptation engine 116; and, c) a plurality of client devices 120. (In a variant, a single content engine 108 would obviate the need for content aggregation engine 112).

As will be explained in greater detail below, each content engine 108 can be based upon its own computing architecture and will periodically send content to aggregation engine 112 for access by one or more client devices 120 via one or more platforms 104. Content engines 108 can be based on any type of known or future Internet content. In a present illustrative, but non-limiting embodiment, content engines 108 are operated by travel actors within the travel industry, including, but not limited to, airlines, railway systems, car rental agencies, cruise line operators, hotels, restaurants, resorts, and spas.

Thusly, content aggregation engine 112 periodically receives data files including content that has been sent by content engines 108 via network 106. In the present example embodiment, content aggregation engine 112 can be operated by, or accessed by, for example, a travel booking engine. To elaborate, a travel booking engine that could operate content aggregation engine 112 could include well-known travel booking engines such as Expedia™, Travelocity™ or Hotels.com™. There are many other travel booking engines. Content engine 112 can thus be operated directly by such a travel booking engine, or can be hosted by a travel data aggregator, often referred to as a Global Distribution System ("GDS"), such as Amadeus™, Sabre™, Travelport™, Apollo™, Galileo™, Travelfusion™, or Duffel™ Aggregation engine 112 thus collects content from content engines 108 for generation on one or more platforms 104, such that content from engines 108 can be accessed by devices 120.

System 100 also includes adaptation engine 116 which normalizes content from engines 108 across platforms 104 and devices 120. Adaptation engine 116 will be discussed in greater detail below.

Client devices 120 can be any type of human machine interface (HMI) for interacting with platforms 104. For example, client devices 120 can include virtual reality gear, augmented reality gear or mixed reality gear, such as headsets, tracking headsets, holographic devices, hand processors, full body sensors, haptic feedback, temperature feedback, smell feedback, treadmill or other foot tracking and feedback technology, and/or combinations of any of the foregoing. In addition, client devices 120 can include smart televisions, traditional laptop computers, desktop computers, mobile phones, tablet computers and any other device that can be used by consumers to receive content via one or more of the platforms 104 that complement the input and output hardware devices associated with a given client device 120. Such traditional client devices 120 can also have connected lights, lightstrips, speakers to provide a multi-media experience on such traditional client devices.

According to the specific example in FIG. 1, device 120-1 is a virtual reality headset; device 120-2 is a first virtual reality station comprising a headset with head, hand and feet tracking technology; device 120-3 is a virtual reality headset with haptic feedback hand processors; device 120-4 is a second virtual reality station comprising a headset with hand, feet, and torso tracking and haptic feedback technology; device 120-5 is a traditional laptop computer and device 120-*p* is a traditional mobile telephone. Again, these are non-limiting examples, but their diversity of input and output devices is illustrative of the diverse human-machine interface aspects of the present specification.

Figure 2:
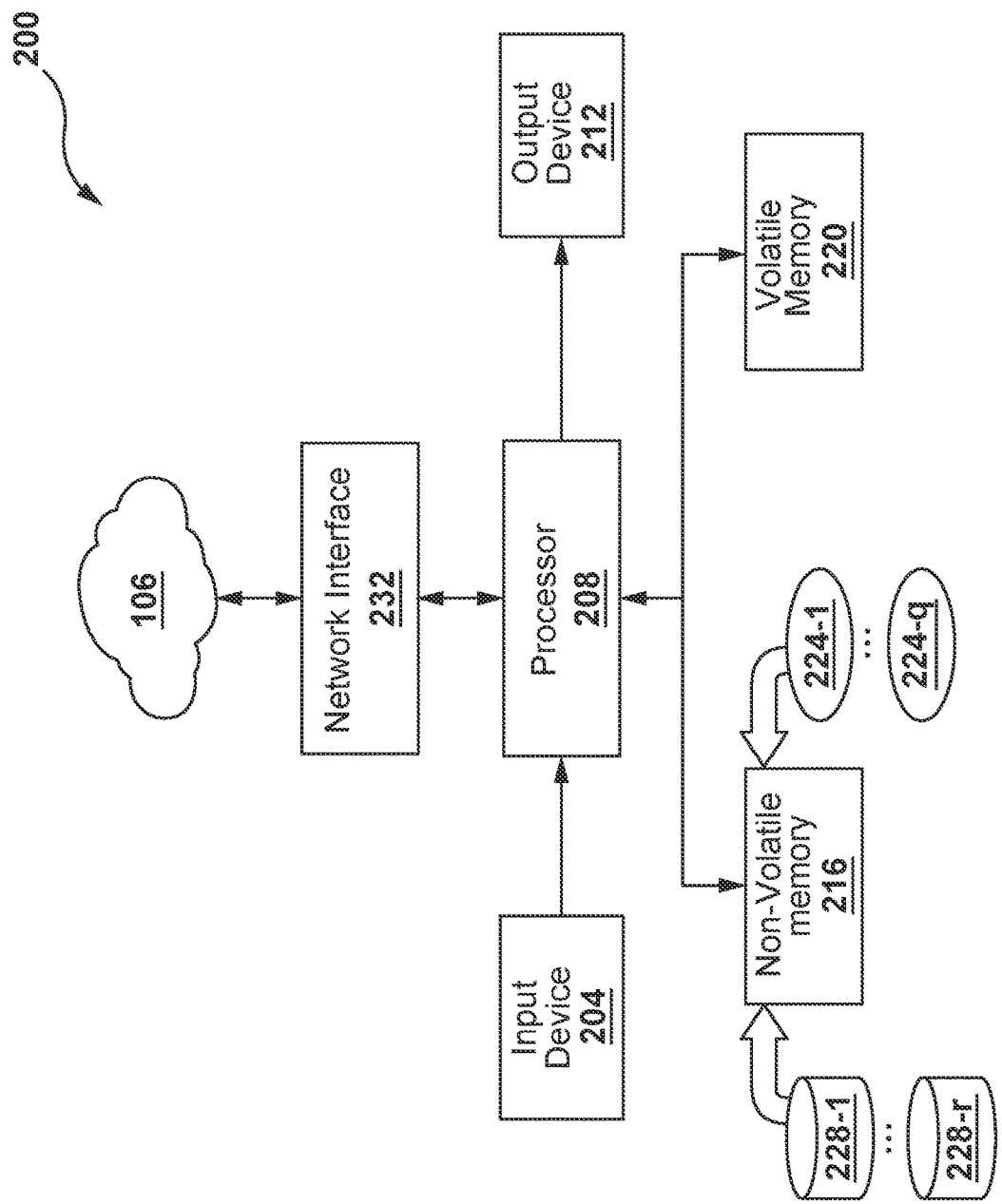
FIG. 2 is a block diagram of example internal components of any server in FIG. 1.

FIG. 2 shows a schematic diagram of a non-limiting example of internal components of a computing device 200. The infrastructure of computing device 200, or a variant thereon, can be used to implement any of the computing nodes, including data source engine 108, data aggregation engine 112, adaption engine 116 or client devices 120. Other than client devices 120 which are based on their own unique input and output hardware form factors as human-machine interfaces, where desired and/or the context permits, one or more of the remaining nodes in system 100 can be implemented virtually inside a single computing device 200.

In this example, computing device 200 includes at least one input device 204. Input from device 204 is received at a processor 208 which in turn controls an output device 212. In the context of all the nodes of system 100, input device 204 can be a traditional keyboard and/or mouse may be connected to provide physical input. Likewise output device 212 can be a display or audio speakers. In variants, additional and/or other input devices 204 or output devices 212 are contemplated or may be omitted altogether as the context requires.

In the specific context of client devices 120, input devices may include physical or virtual keyboards, accelerometers, input buttons, pointing devices, treadmills, temperature sensors, cameras, microphones, global positioning systems (GPS), gyroscopes, olfactometers, velocity sensors, accelerometers, medical sensors (such as pulse rate, blood pressure, stress level, skin moisture level) or any other known or future contemplated input device associated with human-machine interfaces. In the context of client devices 120, output devices may include traditional displays, head-set stereoscope virtual reality displays, augmented or mixed reality displays, haptic feedback, heating or cooling apparatuses, smell generators, sound devices, surround sound systems, smart light bulbs, smart light strips, or any other known or future contemplated output devices associated with human-machine interfaces. Client devices 120 are configured to interact with one or more platforms 104 via network 106 according to the hardware capabilities of a given client device and the corresponding interactive communication capabilities of a given platform 104. (Such hardware, software and interactive communication capabilities may be generically referred to herein as computing resource capabilities.)

Processor 208 may be implemented as a plurality of processors or one or more multi-core processors. The processor 208 may be configured to execute different programing instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of hard-disk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 106 via a network interface 232 which includes a buffer, a modulator/demodulator or MODEM, over the various links and/or internet that connects the server equipment to other server equipment. Depending on the node in system 100, network interface 232 can also be used to connect a given node to another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. One or more tables or databases 228 can also be maintained in non-volatile memory 216 for use by applications 224.

Figure 3:
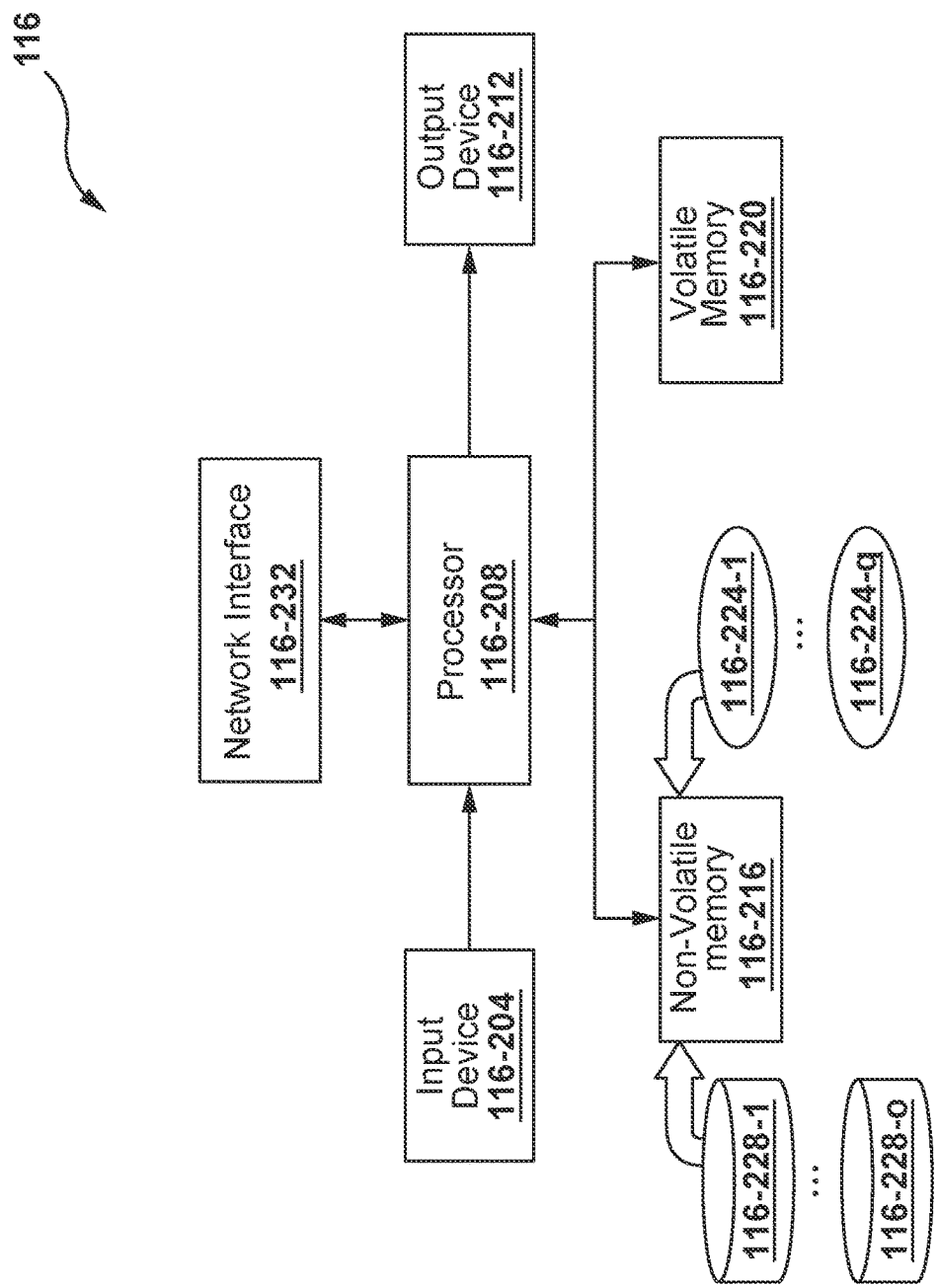
FIG. 3 shows the block diagram of FIG. 2 as applied to the adaptation server of FIG. 1.

FIG. 3 shows adaptation engine 116 in greater detail, identifying its sub-elements according to the structure of computing device 200 from FIG. 2. The nomenclature to identify sub-elements of engine 116 in FIG. 3 borrows from the analogue elements in FIG. 2. Specifically, elements in FIG. 3 are of the format "116-2 ##" whereby the "116" prefix identifying adaptation engine 116 while the "2 ##" suffix refers to the corresponding two-hundred series element from FIG. 2. Thus, specific discussion of sub-elements on engine 116 will use this nomenclature hereafter. (This nomenclature may also be used to reference other sub-elements of nodes in system 100 without necessarily specifically showing a corresponding Figure.)

Figure 4:
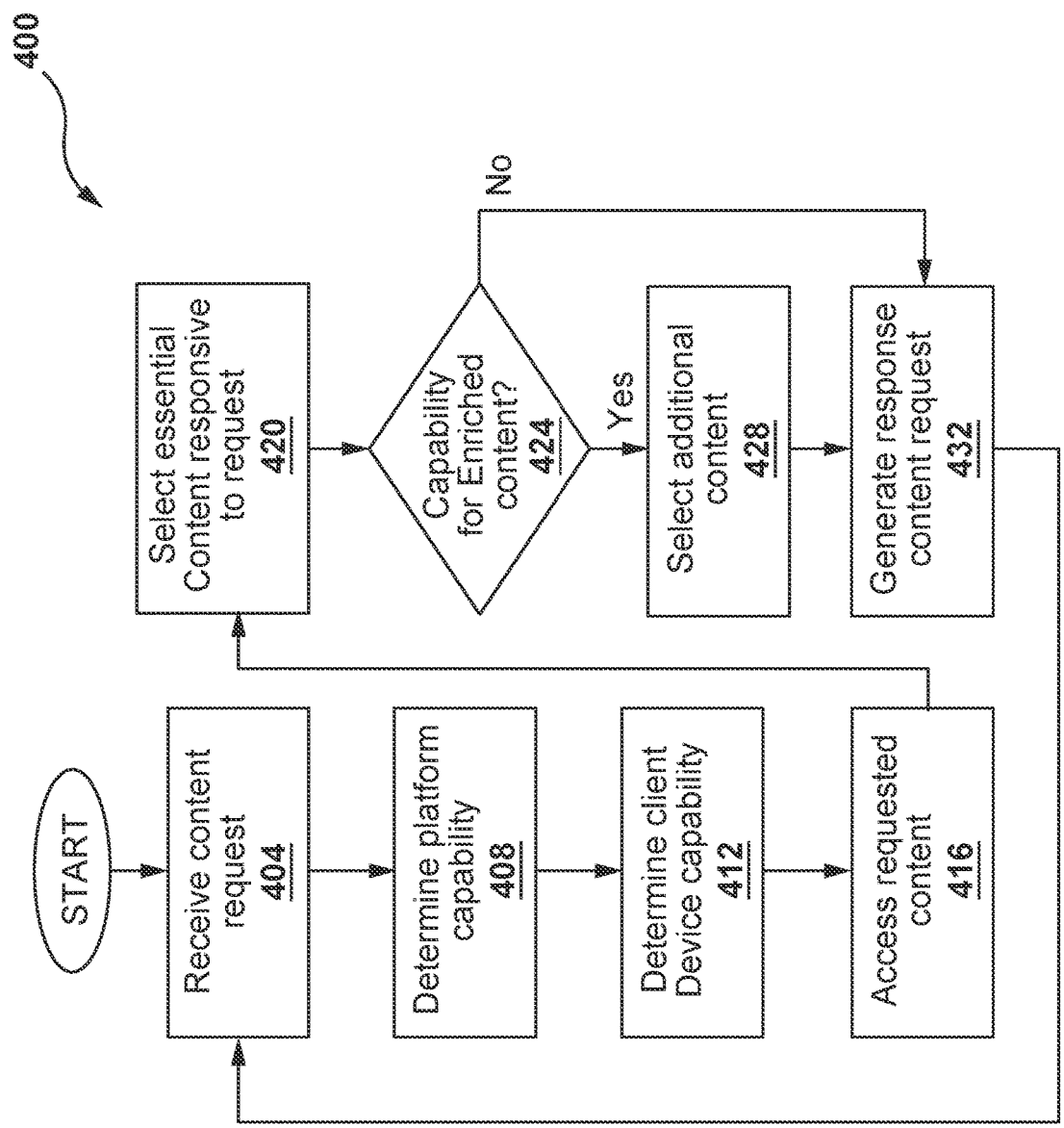
FIG. 4 shows a flowchart depicting a method for multi-platform content normalization.

FIG. 4 shows a flowchart depicting a method for multi-platform content normalization indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 as per the flow chart of FIG. 4 and will be described in relation to its performance on system 100 with a specific focus on adaptation engine 116 and its interactions with the other nodes in system 100.

Block 404 comprises receiving a content request. The content request can originate from a given client device 120 during a session within a session between that client device 120 and a given platform 104. (Alternatively, or in addition, the content request can originate from a given platform 104 based on an inference made by platform 104 of an experience that is to be tailored to a given client device 120.) The establishment of the session is governed by the architecture of the platform 104, according to the credential management and authentication protocols employed by the platform 104, and according to the account associated with a user of the relevant client device 120. As will be discussed in greater detail below, the specific nature of the content request at block 404 thus depends on the context of the session, but in general terms includes sending the request to content aggregation engine 112 from the platform 104.

Figure 5:
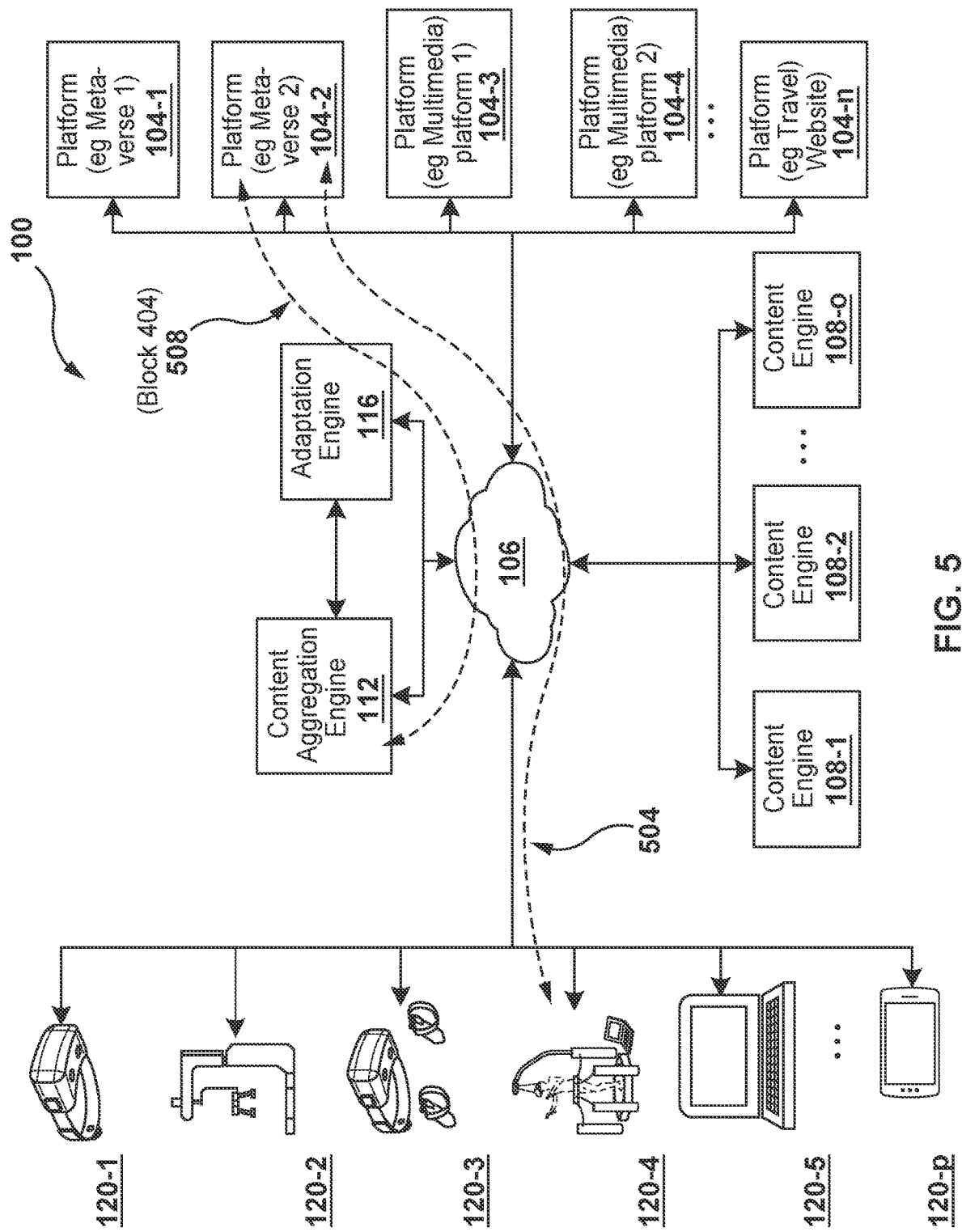
FIG. 5 shows the system of FIG. 1 during a session between a given client device and a given platform.

FIG. 5 shows system 100 illustrating an example session 504 between virtual reality station client device 120-4 and metaverse platform 104-2 expressed as a dotted line between these two nodes. FIG. 5 also shows an example request 508 (representing performance of block 404) from metaverse platform 104-2 to content aggregation engine 112 expressed as a dotted line between these two nodes.

Figure 6:
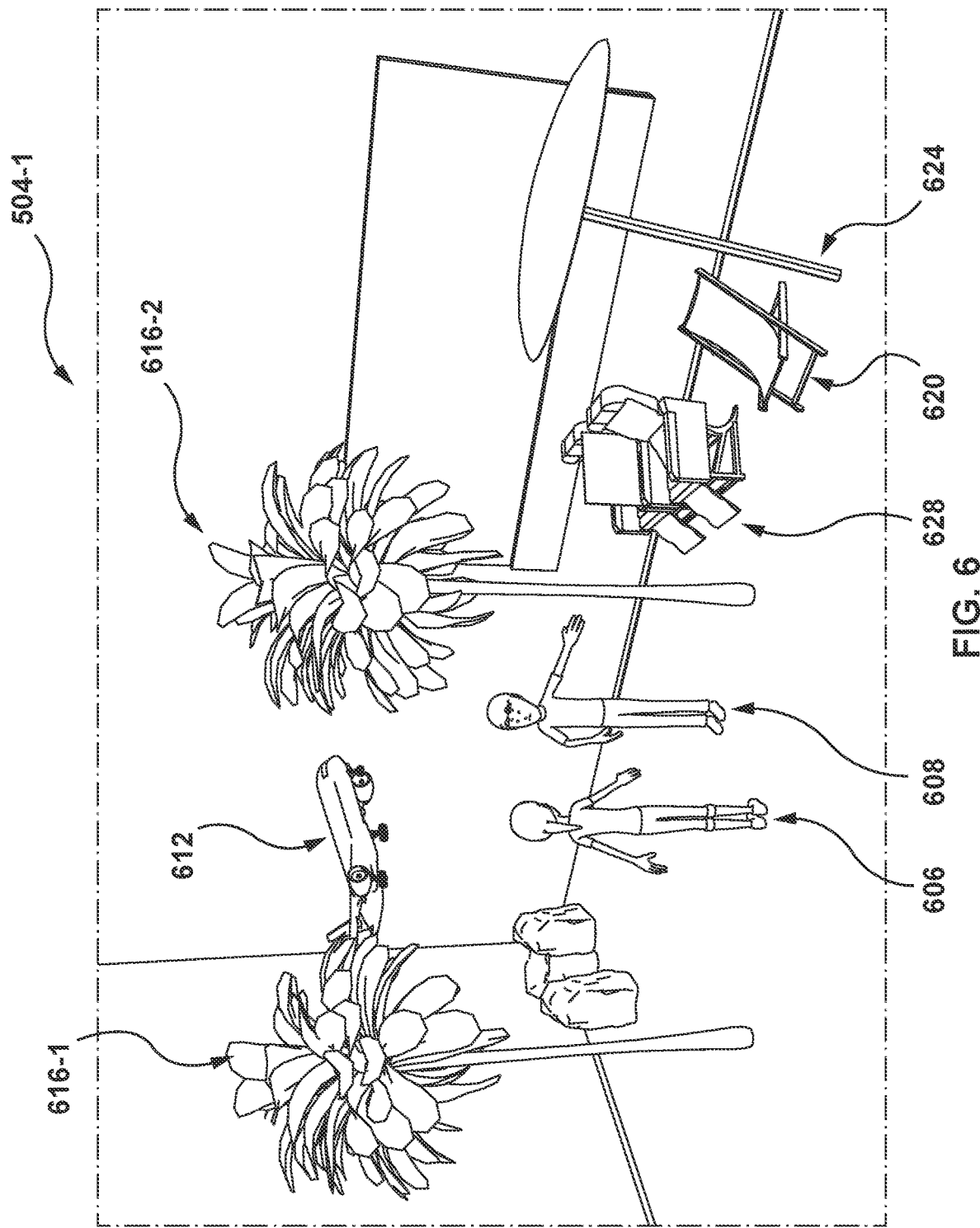
FIG. 6 shows an example rendering of a metaverse environment during the example session of FIG. 5.

The nature of the content request is not particularly limited, but with a few illustrative examples a person of skill in the art will come to appreciate the scope of the present embodiment. As noted earlier, system 100 can have broad application to the travel industry, and thus session 504 can include the opportunity, within a virtual reality environment, to browse, interact with, select and, if desired, provide the technology infrastructure to purchase various travel services. FIG. 6 shows an example illustration of a point in time of session 504-1 within a virtual reality session within metaverse platform 104-2. (The −1 suffix in session 504-1 representing the rendering by platform 104-2 point in time of the session, and this nomenclature is repeated). A person skilled in the art will recognize that the view in FIG. 6 is from a third person perspective, and not from the first-person perspective that could be experienced by the user of client device 120-4 during session 504. Thus FIG. 6 shows a client avatar 606 associated with the user account of client device 120-4. FIG. 6 also shows a travel agent avatar 608 that may be automated or controlled by a human via another client device 120. The entire scene within session 504-1 represents a rendering of a travel agency environment, with client avatar 606 engaging a travel agent avatar 608 to browse travel services. Travel agent avatar 608 is thus shown in FIG. 6 as demonstrating various objects associated with vacation travel including an aircraft 612, palm trees 616, a beach chair 620 and associated umbrella 624 and a pair of airline seats 628.

According to FIG. 6, at this point in session 504-1 client avatar 606 is shown in the seat selection stage of purchasing an airline ticket respective to a given flight on aircraft 612, and thus travel agent avatar 608 is represented as showing airline seats 628 to avatar 606. Thus, according to this example, the request 508 in FIG. 5 can represent a portion of seat selection sub-routine, within an overall flight seat purchasing routine, where that sub-routine includes a request for the seat map associated with aircraft 612 so that a seat within the aircraft 612 for the selected flight can be chosen as part of the purchase of the airline ticket.

At this point the overall context of system 100 should be re-emphasized. In a travel industry context, content aggregation engine 112 can access content from a number of travel industry actors who each host content engines 108. Thus the information regarding the specific flight number that utilizes aircraft 612 and the associated seat map from that flight can be sent from the content engine 108 that manages the flight schedules for that specific flight and aircraft 612. In this manner the travel agent avatar 608 within the metaverse platform 104-2 has access, via content aggregation, to a plurality of travel assets hosted by different content engines 108 as aggregated by content engine 112. Thus the specific seat selection exercise represented within session 504-1 is merely one of many different types of hospitality or travel selection exercises that can be effected within session 504, such as, by way of non-limiting examples, airline ticket purchases, hotel room selection, car rental selection, taxi bookings, excursion bookings, concerts, indoor or outdoor events and festivals, dining receptions, exhibitions, and/or any other travel experience that can occur from the beginning of travel to its conclusion. The client avatar 606 can thus be presented with a complete simulation of the complete travel experience, with browsing and selection options offered throughout the entire simulation. The seat selection request 508 and the seat selection exercise in session 504-1 is thus but one non-limiting illustrative example of the travel purchase interactions contemplated by the present specification. Where system 100 is applied to other industries beyond travel, even more possible types of interactions are possible.

Continuing now with the example of the seat selection, once request 508 (from block 404) is received at content aggregation engine 112, then method 400 advances to block 408.

Block 408 comprises determining the platform capability. In system 100, block 408 is performed by adaption engine 116 working in concert with aggregation engine 112. Adaption engine 116 is thus configured to maintain dataset 116-228-1 which includes all of the capabilities of the various platforms 104. Alternatively, such capabilities may be sent dynamically along with request 508, or a hybrid approach may be employed where some capabilities are stored locally in dataset 116-228-1 while others are sent along with the request 508. Overall, block 408 can be based on an application programming interface (API) or similar functionality provided by the operator of each platform 104. Thus, before a response to the request 508 is made, adaptation engine 116 is configured to assess what forms a response may take that will complement the functionality of the platform 104 that issued the request 508 at block 404.

Continuing with the present example, at block 408, based on the fact that request 508 came from metaverse platform 104-2, the capability determination will note that platform 104-2 is a metaverse environment with a given set of parameters for generating virtual objects and having interactions with those objects according to the specific technological architecture of metaverse platform 104-2. As can be noted from scene 504-1, the metaverse environment is rich and contemplates a virtual reality environment.

Block 412 comprises determining the client device capability. More specifically, block 412 comprises determining the capability of the client device that generated the request 508 at block 404. In system 100, block 408 is performed by adaption engine 116 working in concert with aggregation engine 112. Adaption engine 116 can thus be configured to maintain a second dataset 116-228-2 which includes all of the capabilities of the various client devices 120. Alternatively, such capabilities may be dynamically sent along with request 508, or a hybrid approach is possible where some capabilities are sent with the request 508 and others are maintained within dataset 116-228-2. Indeed, like block 408, block 412 can also be effected as part of any API associated with the relevant platform 104. Such client device capabilities are determined based on the specific input and output device hardware configurations of the human-machine interface associated with the requesting client device 120. In the example of FIG. 5, virtual reality station client device 120-4 is noted to be a full body virtual reality rig, complete with haptic feedback and sensing for the eyes, hands, torso, and feet.

Block 416 comprises accessing the requested content. In the specific example being discussed in relation to a seat map for aircraft 612, it is contemplated thus that content aggregation engine 112 will access content with a respective content engine 108, such as a content engine 108 operated by the airline that owns aircraft 612 and is offering the flight of interest to avatar 606.

Block 420 comprises selecting essential content that is responsive to the request from block 404. (Selecting can be effected in different ways, such as through an inclusion process by choosing from a plurality of stored content, or by an exclusion process by filtering out certain content from the plurality of stored content.) Such essential content is the minimum set of content required to fulfill the transaction (or other interaction) occurring in session 504-1; namely, in the present non limiting example, the selection of a seat on aircraft 612. Thus, the minimum information would include what seats remain available on the aircraft in association the pricing of those seats.

Block 424 comprises determining if there is capability for providing enriched content beyond what was filtered at block 420. In the context of the present example, indeed the rich 3D virtual environment of metaverse platform 104-2 combined with the extensive set of virtual reality input and output devices on client machine 120-4 would lead to a "yes" determination at block 424.

Block 428 comprises selecting additional content. (As noted above, selecting can be effected in different ways, such as through an inclusion process by choosing from a plurality of stored content, or by an exclusion process by filtering out certain content from the plurality of stored content.) The additional selected content is responsive to the request from block 404 and matches any enhanced hardware and software capabilities of the platform 104 and the corresponding client device 104 that is carrying the respective session 504. To clarify, such enhanced hardware and software capabilities refer to any capabilities that go beyond the ability to generate the essential content from block 420. Continuing with the present example, block 428 would take the full set of rich content from block 416 to generate a very rich seat map of all available seats on aircraft 612. As will be explained further below, the degree of "richness" corresponds directly to the hardware of client machine 120 and the platform 104 that generated the request.

Block 432 comprises generating a response to the request from block 404 according to the selections applied at block 420 and block 428. Where different platforms 104 can accommodate the same content, but have different capabilities for presenting that content, then the generation of the response can include adaptations to the selected content respective to the specific capabilities of the target platform 104. To help elaborate, and referring again to our specific example, in association with a fully capable metaverse platform 104-2 and client device 120-4, the full seat map could include a nearly complete rendering of the entirety of the interior cabin of aircraft 612, having very rich textures and visual appearance of seat 628, such as the view of seat 628 in FIG. 7. Processor 116-208 in adaptation engine 116 can thus be configured to interact with target platform 104-2 so that all features of the seat can be viewed at client device 120-4 over session 504. Furthermore, by shifting to a third person perspective avatar 606 can be shown sitting in the seat and accessing its various virtual features, all of which would mimic the actual performance of the seat on the aircraft 612. Using method 400, additional seat choices can be loaded and rendered within session 504 in similar fashion, until an actual selection of seat was made thus advancing the entire workflow of selecting various travel services. Note that the same content may be possible to generate on platform 104-3, but with different limitations, such as number of pixels or colors, or other variables, then block 432 can include an adaptation that is effected to accommodate the different limitations of platforms 104 that are otherwise capable of generating substantially the same content.

A person of skill in the art can now appreciate just where the virtual reality experience can extend to what additional filters may be applied at block 428, as such that in a fully capable client device 120-4 such as client device 120-4, the user of client device 120-4 could virtually "walk" through the cabin via feedback and input from the treadmill input/output device on client device 120-4, providing visual feedback of the entire walk through the aircraft. Occupied seats would show avatars inside them, while available seats would be empty for the avatar 606 to simulate virtually sitting various empty seats. With the full set of haptic feedback provided to hands, torso and feet, and a mapping of the physical size of the user, the user of client device 120-4 could control virtual reclining and test out the widths and foot room of the various seats with appropriate feedback and control signals being sent to the input and output device hardware associated with that client device 120-4. The inventors fully appreciate that the limits of this example correspond to the physical limits of the virtual reality input and output devices associated with client device 120-4, but also note that the rapid development of such rigs suggests a continuum of greater offerings and such offerings are likely to extend over the coming years.

A person of skill in the art can now appreciate that system 100 also remains compatible with other client devices 120 and platforms 104. Notably, where a platform 104 or a client device 120 does not have full metaverse capability then system 100 and adaption engine 116 remains flexible to accommodate different technologies. For example, where a seat map request was generated by a mere virtual reality headset 120-1, the seat map response at block 432 would be limited to a virtual view of the inside of the aircraft, but the capability to "walk" through the aircraft would be limited to the mouse or keyboard attached to the computer that connects to the headset 120-1. There would also be curtailed or no opportunity to virtually "sit" in the seat and test the reclining and foot room. As a second example, where the seat map request was generated by laptop computer client machine 120-5, and the platform was travel website platform 104-$n$, then the filters applied at block 428 would be limited to generating a seat map that is consistent with currently known browser-based seat mapping and seat selection technology, in the form of a two dimensional array of boxes roughly laid out in grid, such as the example seat map 800 in FIG. 8. System 100 can also accommodate traditional travel service acquisitions through voice telephony and text such as short message service (SMS).

Figure 9:
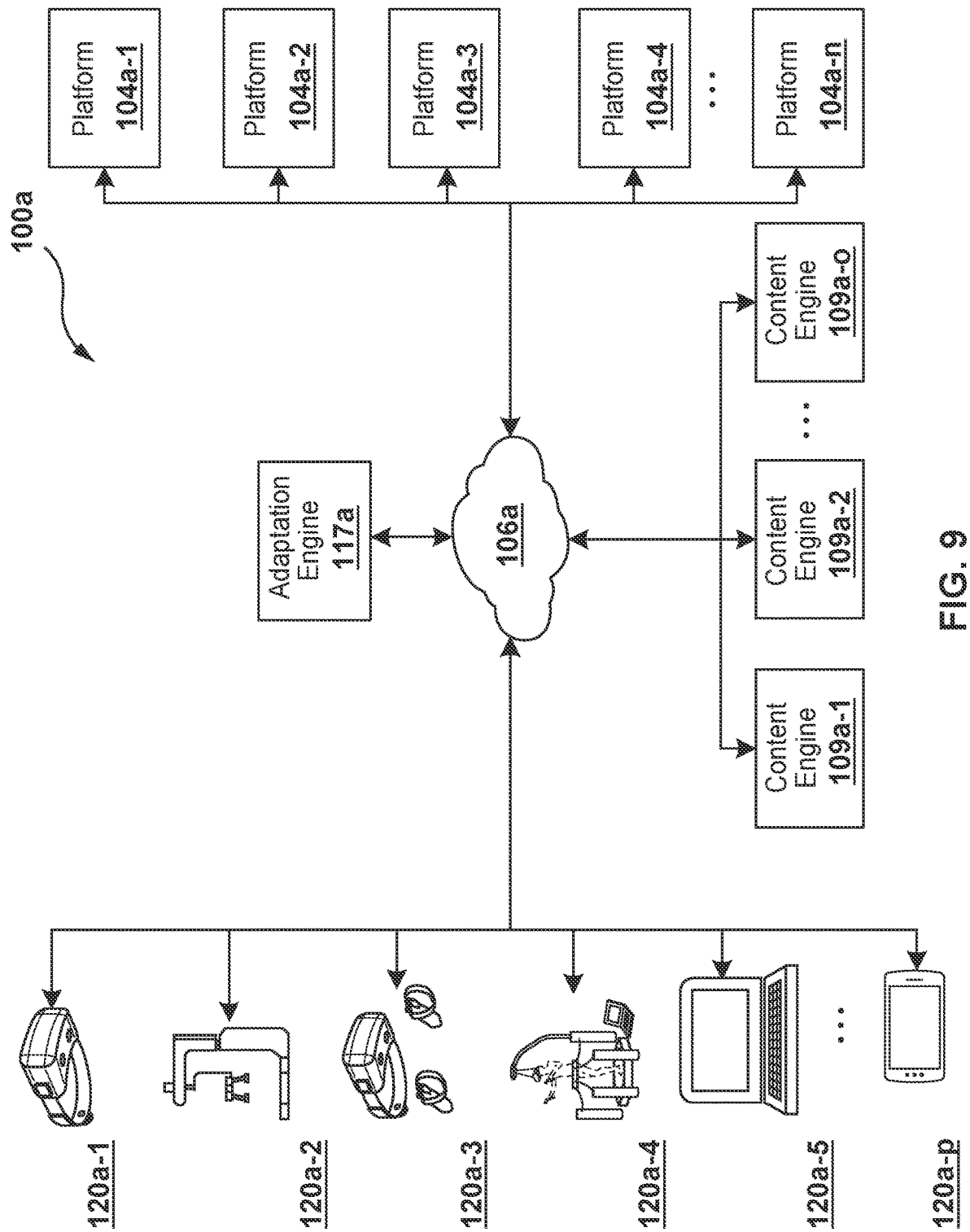
FIG. 9 is a schematic diagram of a system for multi-platform content normalization of a virtual retail store.

Referring now to FIG. 9, in accordance with another embodiment, another system for multi-platform content normalization is indicated generally at 100a. System 100a is a variant on system 100, and thus like elements bear like references, except followed by the suffix "a". Network 106a, devices 120a and platforms 104a are substantially the same as their counterparts in system 100, although may be varied somewhat as the context requires from the following discussion. However, it is to be noted that content aggregation engine 112 is omitted from system 100a. It is also to be noted that, content engines 108 are significantly varied and are therefore omitted and replaced instead with content engines 109a. Furthermore, adaptation engine 116 is significantly varies and therefore omitted and replaced instead with adaptation engine 117a. Content engines 109a and adaptation engine 117a and their interactions with the other nodes in system 100a will be explained in greater detail below.

According to system 100a, content engines 117a are hosted by different retail entities that are establishing virtual (or augmented) reality retail stores within platforms 104a. In general, such virtual or augmented reality stores provide a consistent shopping experience across a plurality of platforms 104a through the entire sales process. (Such a sales process is sometimes referred to by the person of skill in the art as a sales funnel or sales touch points, going from, for example, marketing, lead generation, proposals, sales, conversions, payment processing, closed-won, closed-lost, retention etc. The sales process can be defined differently according to the context of what product or services is being sold and whether the process is business-to-business or business-to-consumer.) The shopping experience is thus typically adapted to the overall narrative of the platform 104a.

For example, the sales process can be reproduced in a medieval fantasy metaverse platform, replete with metaverse objects such as unicorns, satyrs, elves and magicians. In such medieval fantasy metaverse, the shopping experience is tailored to the medieval fantasy narrative, and thus while the shopping experience remains the same as a real-world retail store, the appearance of objects that fulfill the shopping experience would be consistent with the medieval fantasy. As another example, the sales process can be reproduced in a space opera replete with metaverse objects such as starships, laser cannons, multiple planets, strange aliens and intergalactic battles. Thus in a space opera metaverse, the shopping experience can be tailored the space operate narrative, and so the appearance of objects that fulfill the shopping experience would be consistent with the space opera.

In other examples, such virtual stores are configured to mimic real-world retail stores that are configured electronically according to flexible architectural designs that allow a metaverse environment to represent a real-world retail environment. Without limiting the generality of the foregoing, certain specific examples of real-world mimicry of retail stores will now be discussed in relation to platforms 104a. The virtual stores can be generated within platforms 104a according to any real or imagined environment where retail-stores may exist, such as a cluster of retail stores or a row of retail stores along a virtual commercial avenue or street, in an virtual outlet mall, or in virtual airport, train station, cruise-ship or shopping mall. One particular example application of such retail entities that will be discussed herein relate to travel agencies that, in the real-world, attract foot traffic and offer the opportunity for travelers and travel agents to interact, review travel itinerary options, and to complete the purchase of travel assets.

Notably, content engines 109a in system 100a are hosted by retail entities. Each content engine 109a maintains a model of a virtual retail store that is to be rendered across one or more platforms 104a. Note that a single content engine 109a is contemplated, but a presently preferred embodiment contemplates a plurality of content engines 109a, with each content engine 109a representing a single travel agency intending to provide substantially the same virtual retail presence across a plurality of platforms 104a. Thus, adaptation engine 117a is configured to receive models from each content engine 109a, determine criteria for rendering on each platform 104a, and to dynamically adjust the models to provide, as much as a possible, a substantially normalized virtual retail environment across all platforms 104a. In other words, as a given client device 120a accesses different platforms 104a, substantially the same virtual retail environment and experience will be perceived, for each content engine 109a, thereby increasing potential for retail transaction exposures to the hosts of content engines 109a.

Again, as a specific example, travel agencies, as a type of retail entity, will be discussed herein for illustrative purposes, but it is to be understood that the teachings herein can be applied to other types of retail entities.

Figure 10:
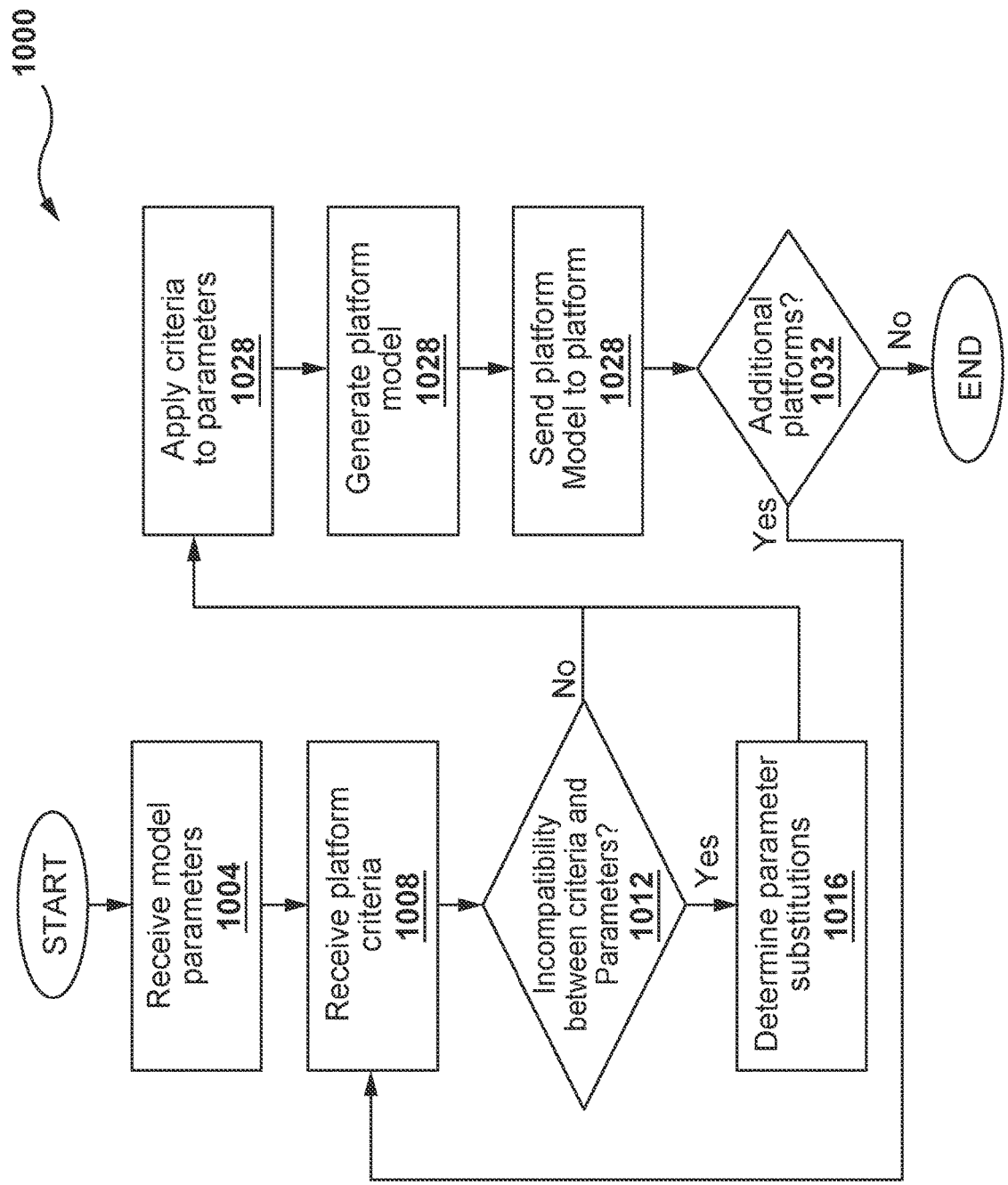
FIG. 10 shows a flowchart depicting a method for multi-platform content normalization of a virtual retail store.

FIG. 10 shows a flowchart depicting another method for multi-platform content normalization indicated generally at 1000. Method 1000 can be implemented on system 100a. Persons skilled in the art may choose to implement method 1000 on system 100a or variants thereon, (such as in combination with system 100), or with certain blocks omitted, performed in parallel or in a different order than shown. Method 1000 can thus also be varied. However, for purposes of explanation, method 1000 as per the flow chart of FIG. 10 and will be described in relation to its performance on system 100a with a specific focus on adaptation engine 117a and its interactions with the other nodes in system 100a.

Block 1004 comprises receiving model parameters. In the example of system 100a, the model parameters are received at adaptation engine 117a from one of the content engines 109a. The initial parameters can be initially established via an administrator at the content engine 109a controlling input devices such as a mouse and keyboard and viewing a monitor and accessing other input/output devices in order to create a set of model parameters for delivery to adaptation engine 117a. According to the present example, the model parameters represent a virtual reality travel agency for rendering in a metaverse on one or more of platforms 104a.

FIG. 11, FIG. 12, FIG. 13 and FIG. 14 show graphic example of a set of model templates 1100 of a virtual travel agency that can be offered as part of system 100a to an administrator at a content engine 109a. The set of model templates 1100 can be hosted by adaptation engine 117a or elsewhere as desired. The set of model templates 1100 can be customized to create a set of model parameters in fulfillment of block 1004. It is contemplated that a plurality of model templates representing different architectures can be offered, providing choice to each content engine 109a in the same manner a real-world architect would permit customization of a physical retail store. Thus the model templates 1000 represent only a single one of the options for model templates that are offered.

Figure 11:
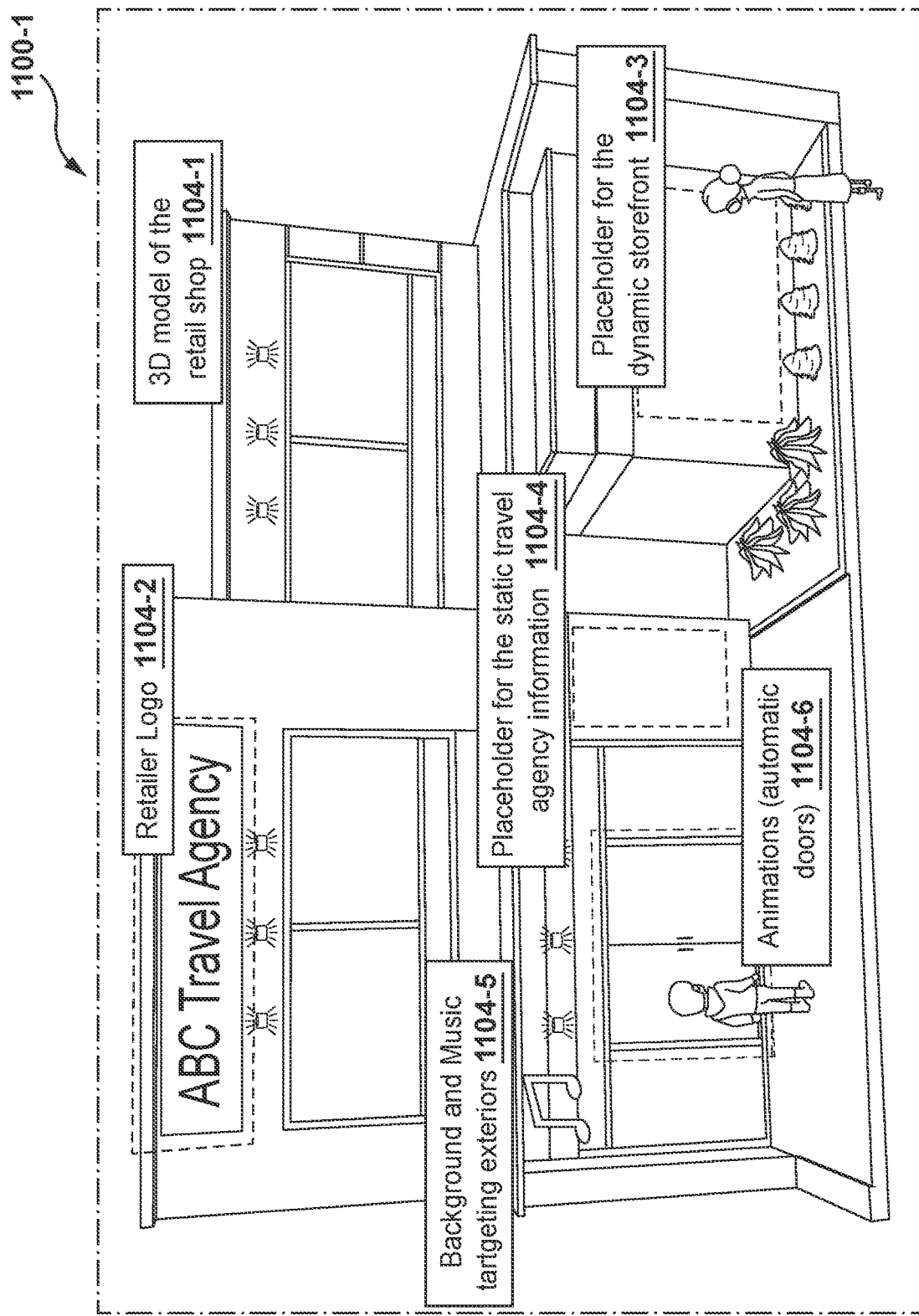
FIG. 11 shows an example model of the exterior or a virtual retail store.
Figure 12:
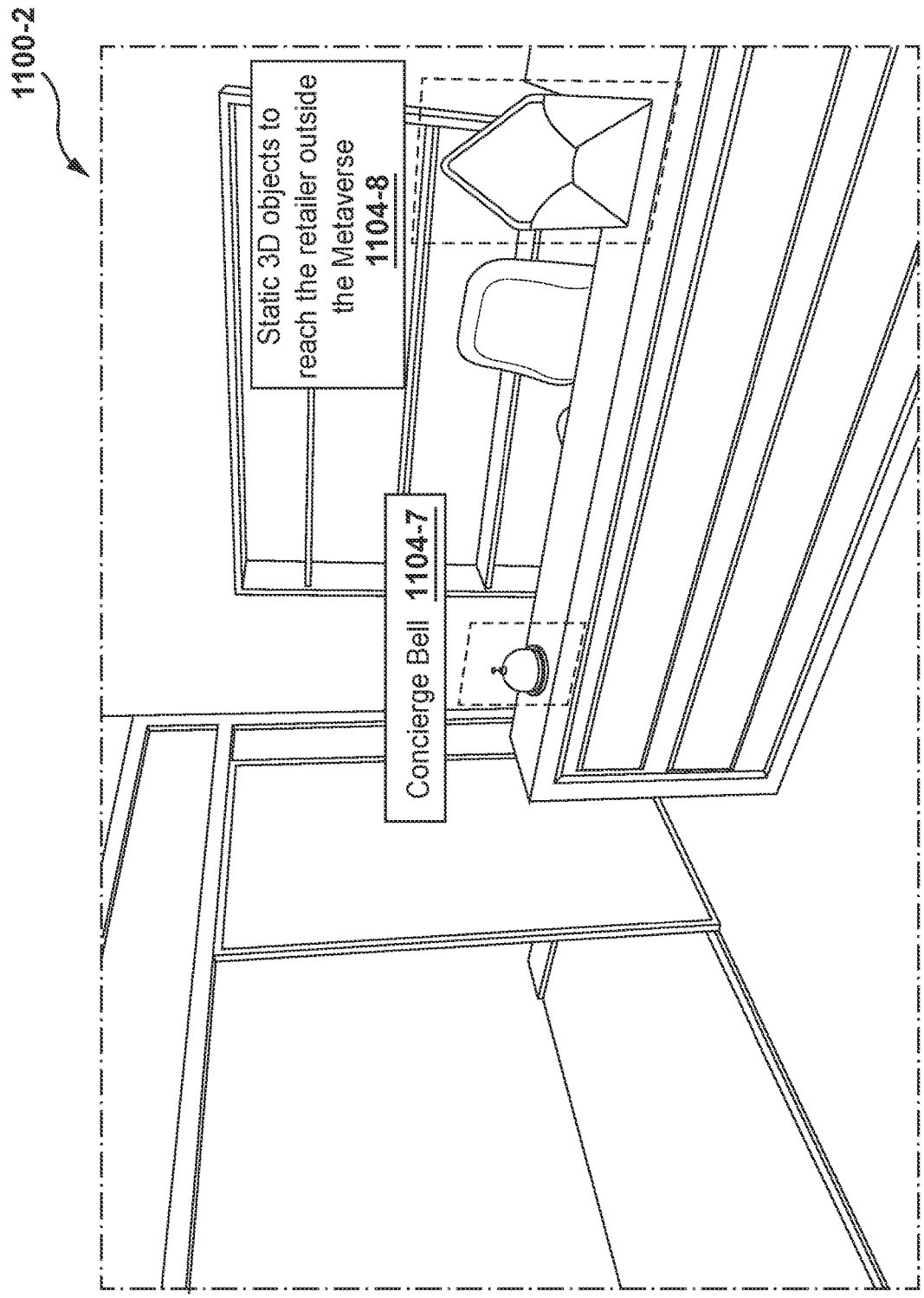
FIG. 12 shows an example model of an interior view of a virtual retail store.
Figure 13:
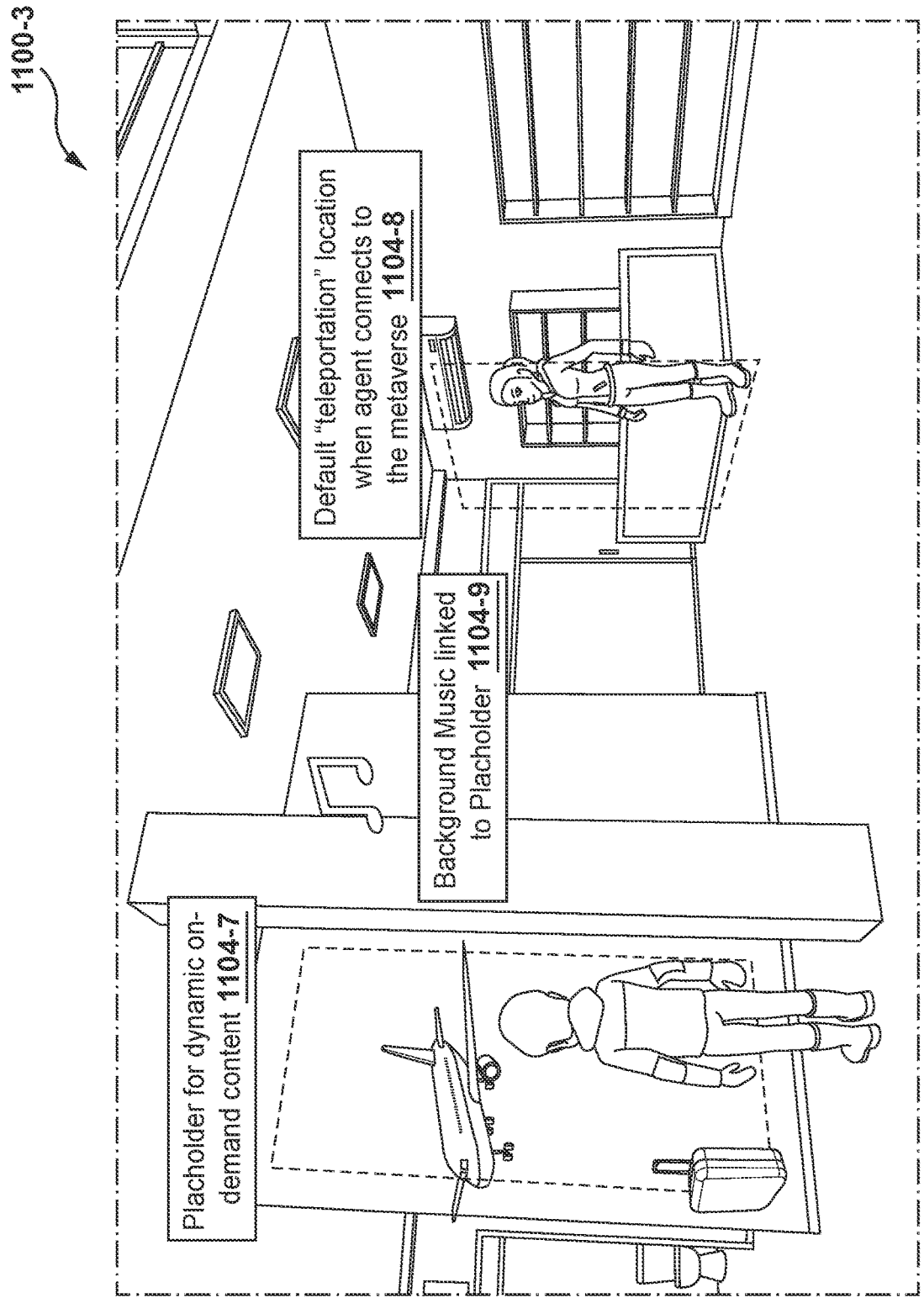
FIG. 13 shows an example model of another interior view of a virtual retail store.
Figure 14:
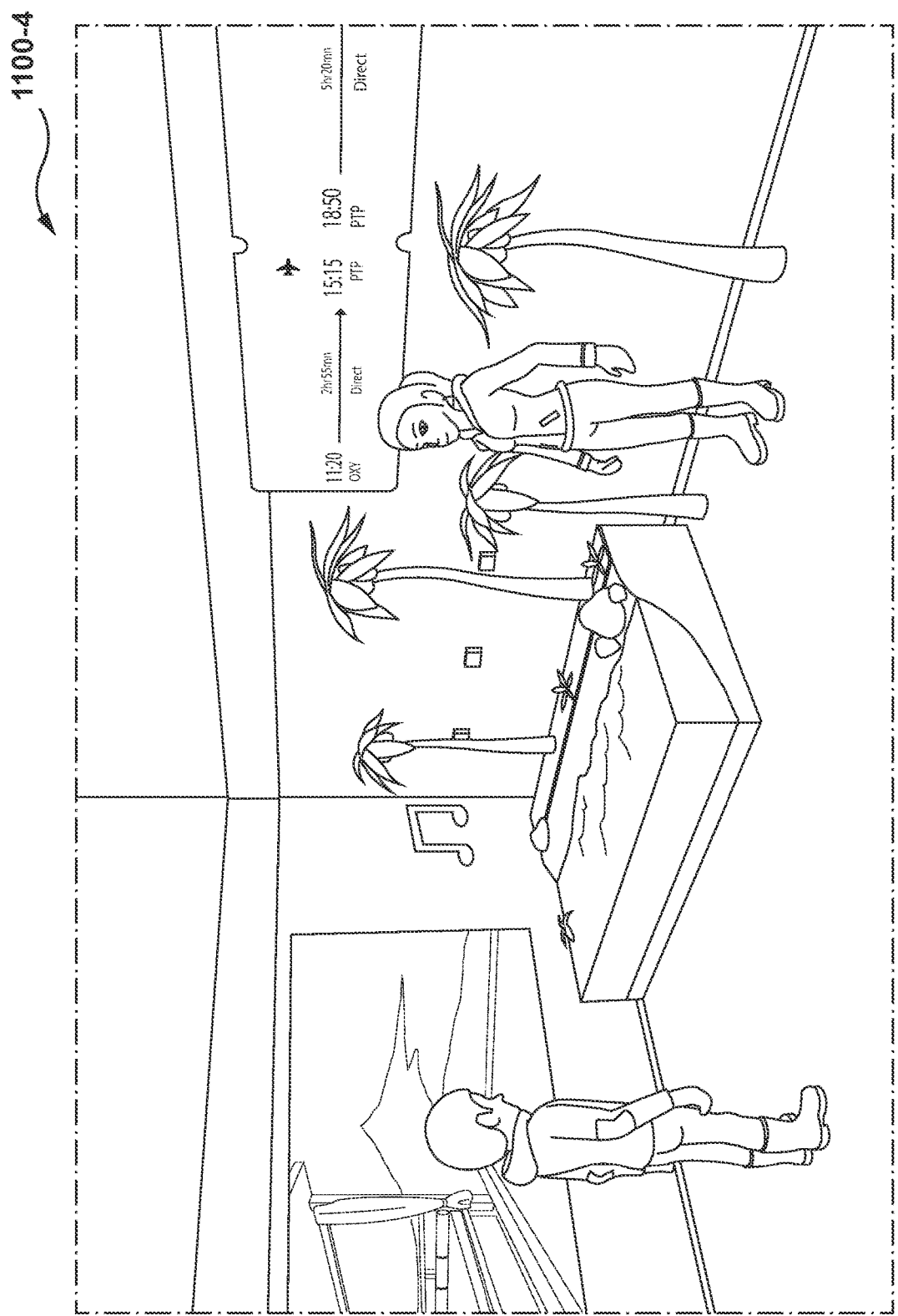
FIG. 14 shows an example model of another interior view of a virtual retail store.

FIG. 11 shows various objects that may be customized. FIG. 11 shows an exterior template 1100-1. Shop model object 1104-1 represents the overall virtual architectural model for the virtual retail store, both interior and exterior. FIG. 11 focuses on the exterior. FIG. 12, FIG. 13, and FIG. 14 show interior views of the shop model object 1104-1. Model object 1104-1 thus shows a two-story building with upper floor windows and lighting, while wood cladding is shown on the side with the entrance door. Landscape features are shown on the ground out front. A single shop model object 1104-1 could be offered to all content engines 109*a*. However, a plurality of shop model objects 1104-1 may be offered in system 1100*a*, and FIG. 11 shows only but one. Furthermore, if desired, the overall shop model object 1104-1 could be made available for only one of the content engines 109*a* and therefore provide potential exclusivity for and potential for virtual brand recognition for a given content engine 109*a*, such that no other content engine 109*a* would be able to create a confusingly similar model.

Logo model object 1104-2 can be configured to display the trademark or service mark of the entity that operates content engine 109*a*. The trademark can be the same as any real-world trademark registrations, thereby creating cross brand recognition across the virtual world of platforms 104*a* and the real-world.

Note some objects of the model parameters received at block 1104 may be flagged (such as through a "tick box") as "substitutable" across platforms 104*a* or "not substitutable" across platforms 104*a*. It is contemplated that, for example, logo model object 1104-2 may be designated as "not substitutable" due to the desire to maintain the appearance of trademark branding consistency across platforms 104*a*, each of having its own criteria engine consistent the individual capability of each platform 104*a*. (These are the same sorts of capabilities previously discussed in relation to block 408 of method 400). Accordingly, as will be discussed in greater detail below, logo model object 1104-2 would be constrained to a format or characteristics of input from content engine 109*a* that complies with the rendering criteria of platforms 104*a*.

Thus, formatting or other characteristics such as size, color, skin, noises, sounds, sizes, styles, fonts, resolutions, animations, lighting, shading, refresh rates and associated audio clips may all be constrained to a set of parameters that are known to comply with capabilities across all platforms 104*a*. In the context of styles and resolutions, it can be noted that certain platforms, such as Minecraft, have the criteria that objects a very low resolution and are "blocky" by design, whereas other platforms have very high resolutions and may be curved. Thus the model parameters, when inputted, adapted or substituted, consider these criteria.

Referring again to FIG. 11, dynamic storefront object 1104-3 can represent a virtual display showing advertisements, offers or features or any other content. Dynamic storefront object 1104-3 thus may have static information or be configured to receive dynamic information from a source such content engine 109*a*, or even from one or more additional sources as content engines 108 of system 100. Dynamic storefront object 1104-3, is, in general, designed to virtually mimic the storefront of a real-world retail store.

Static storefront object 1104-4 can represent a physical sign such as "store hours" or "address" that, in general, mimics the equivalent of such information of a real-world retail store.

Music object 1104-5 includes a source of a feed of music, either looped or streams, or other audio information such as recorded voice messages, that can be played at the exterior of the model template 1100-1 in order to attract avatars of virtual passers-by, such avatars being controlled via devices 120*a* as previously discussed in relation to system 100.

Door animation object 1104-6 allows the configuration of the whether the doors are sliding doors or swing doors, and whether there is a physical actuator or whether a presence detection is sufficient to open the door. Audible sounds can accompany the opening or closing of the doors. A virtual doorbell may also be provided. Other door animations will now occur to those skilled in the art.

FIG. 12 shows additional objects that may be customized. Firstly, foyer model template 1100-2 shows the immediate interior area of shop model object 1104-1. The interior includes a reception desk with shelving and walls. While not labelled, these objects may be customized with colors, logos, signs, artwork, etc. and as desired. A virtual concierge bell object 1104-7 is provided and as mailbox object 1104-8 is also provided. Object 1104-7 and object 1104-8 can be configured as ways to contact a real world individual who represents the retailer, such as by way of a text message, email, or phone call or an individual operating a client device 120*a* who represents the retailer that is respective to the content engine 109*a* that crated the model template 1100.

FIG. 13 shows an additional interior model template 1100-3 of shop model object 1104-1. Again several objects of the template 1100-3 can be customized including colors, logos, signs, artwork, etc. Specific example objects include a "self serve" area 1104-7 where a customer avatar controlled via a client device 120*a* can interact with content, or an in person service area a customer avatar controlled via a client device 120*a* can interact with a customer-service representative avatar controlled via another client device 120*a*.

FIG. 14 shows an additional interior model template 1100-4, but with further objects having been implemented including artwork, music and a display. FIG. 14 shows a customer avatar controlled via a client device 120*a* interacting with a customer-service representative avatar controlled via another client device 120*a*.

Figure 7:
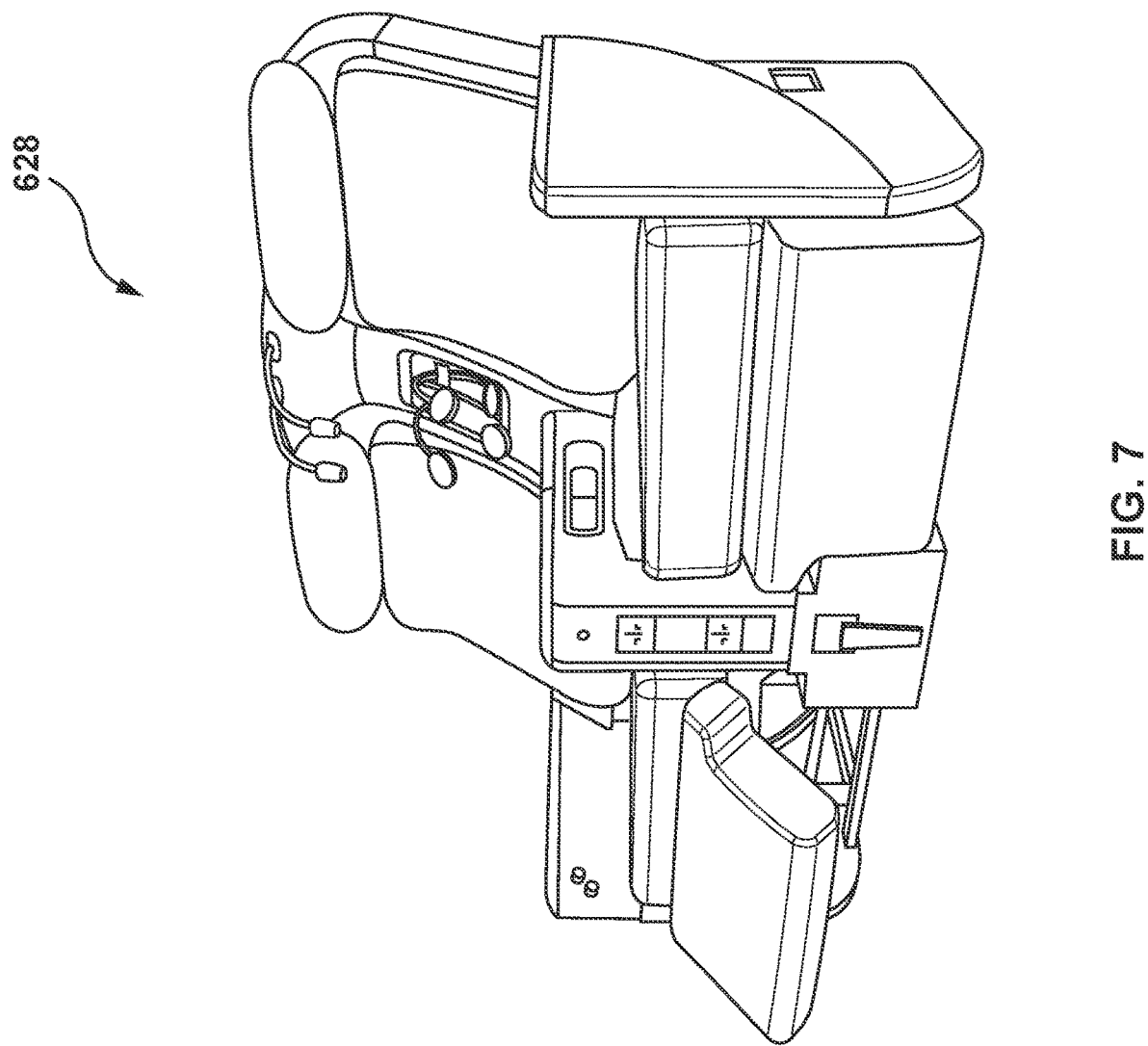
FIG. 7 shows an example of a detailed and rich rendering of an airline seat that can be selected during the example session of FIG. 6.
Figure 8:
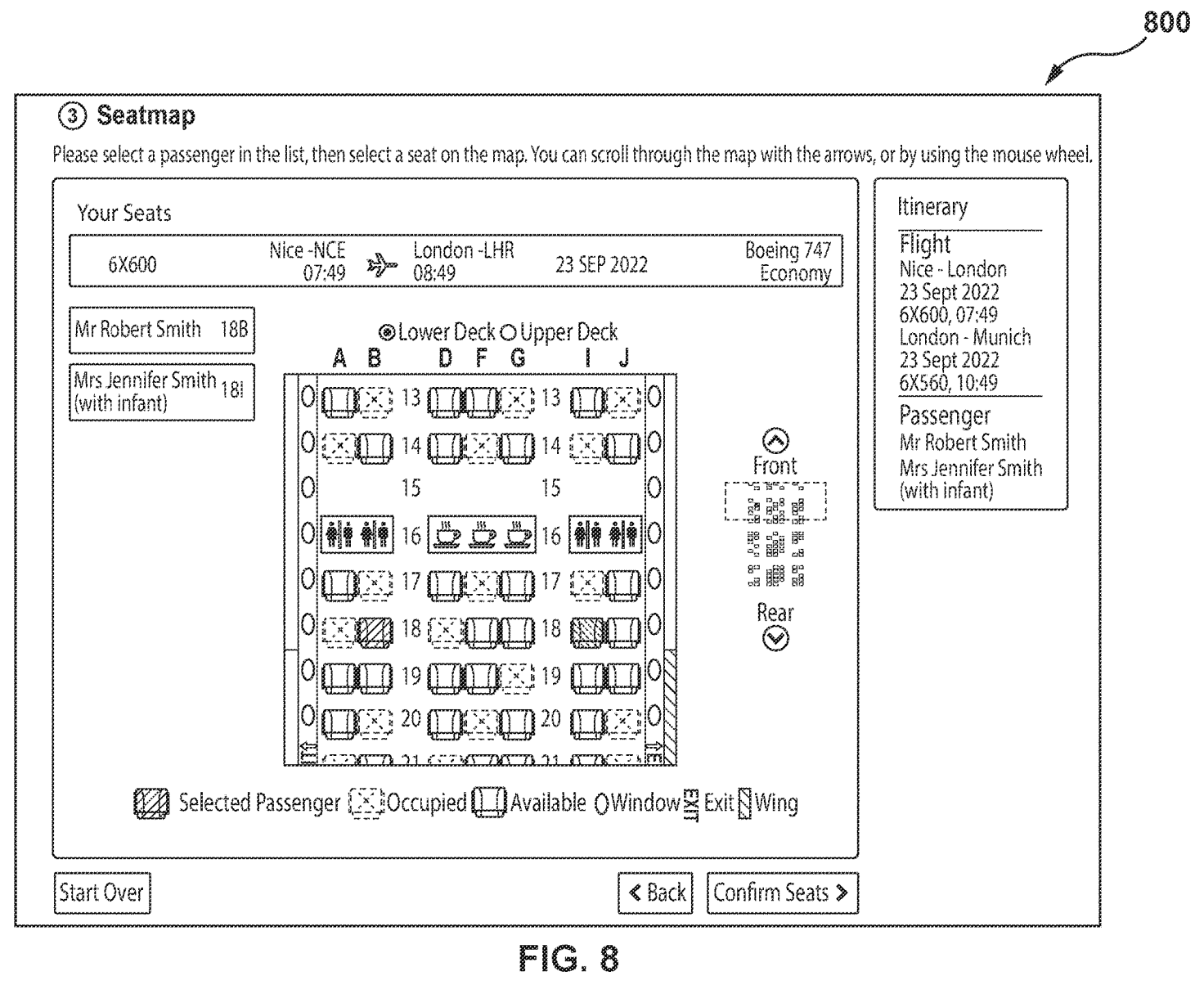

A person of skill in the art will now begin to appreciate how system 100 and system 100*a* can be combined, as the interaction in FIG. 6, FIG. 7 and/pr FIG. 8 can be performed within a variation of the interior model template 1100-4. In the combination of system 100 and system 100*a*, different virtual travel agencies according to system 100*a* can offer the same content from different content engines 108 within their own uniquely virtually branded environment. The combined synergies of system 100 and system 100*a* lead to even further efficiencies in such a combined system, as virtual travel agency retailers can render a single version of their retail store via adaptation engine 117*a* across several platforms 104*a*, while adaptation engine 116 provides immersive traveller purchasing experience and choice of content form several content providers 108. Individuals using devices 120 (and/or the analogue devices 120*a*) thus benefit from both a boutique experience in the form of model templates 1100 while having access to a broad range of travel experiences from content engines 108.

Referring again to FIG. 10, having received model parameters at block 1004, at block 1008 various platform criteria are received. The way platform criteria are defined is not particularly limited and generally consistent with whatever application programming interfaces (APIs) are offered by respective platforms 104*a*. FIG. 15 shows a highly simplified example of platform criteria defined in a matrix 1500 with capabilities defined in rows and corresponding "Yes" or "No" flags under columns representing each platform. Thus, in the example of FIG. 15, the criteria can be considered a set of rules implemented as predetermined correspondences defined in the matrix or table, with a series of "fallback" or substitutions defined in the matrix 1500.

Returning to FIG. 10, block 1012 comprises determining if there are incompatibilities between the criteria received at block 1008 and the parameters received at block 1004. Note the two example capability criteria given in FIG. 15. But any type of capabilities and associated criteria are contemplated. To give a simple illustration, the door animation object 1104-6 may be provided with parameters at block 1004 that the doors are to be sliding and have an accompanying whistle sound. While platform 104a-1, and platform 104a-2 may be able to render door animation object 1104-6 according to these parameters, platform 104a-3 may be incapable and only able to render a swinging door.

Thus, if there are no incompatibilities at block 1012, a "no" determination is made and method 1000 advances to block 1020. However, if there are incompatibilities at block 1012, then a "yes" determination is made and method 1000 advances to block 1016. According to the previous example, a "no" determination may be made for object 1104-6 at block 1012 for platform 104-1 and platform 104a-2, and so for platform 104a-1 and platform 104a-2, method 1000 advances to block 1020 where whatever API criteria for the respective platform 104a are applied. Again, according to the previous example, a "yes" determination may be made for object 1104-6 for platform 104-3 at block 1012 and method 1000 advances to block 1016 where a substitution parameter is applied. For example, assume the platform 104a-3 can only accommodate swinging doors with no accompanying audio, then at block 1016 the swinging door parameter for object 1104-6 is substituted with a swinging door. Method 1000 then advances to block 1020 and swinging door parameter criteria is applied to the model is applied, based on the API of platform 104a-3.

Again this is but one example and a plurality of criteria based on the APIs for each platform 104a will be canvassed based on the capabilities of the respective platforms 104a and dealt with accordingly at block 1012 and, if necessary, at block 1016. Note from our previous discussion, however, that at block 1004 a given model parameter may be indicated as not being capable of substitution, in which case for that parameter a "No" determination will always be made at block 1012, with the tradeoff that the parameters provided at block 1004 may be constrained to ensure compliance with the capabilities and APIs of all platforms 104a.

Block 1024 comprises generating the model platform. In system 100a block 1024 is performed by adaptation engine 117a which renders the model parameters and uses the API of the respective platform 104a.

Block 1028 comprises sending the platform models, as generated at block 1024 to each platform 104a for rendering.

Block 1032 considers whether all target platforms have been addressed. If not, method 1000 returns to block 1008 until all such platforms 104a have been addressed.

Figure 16:
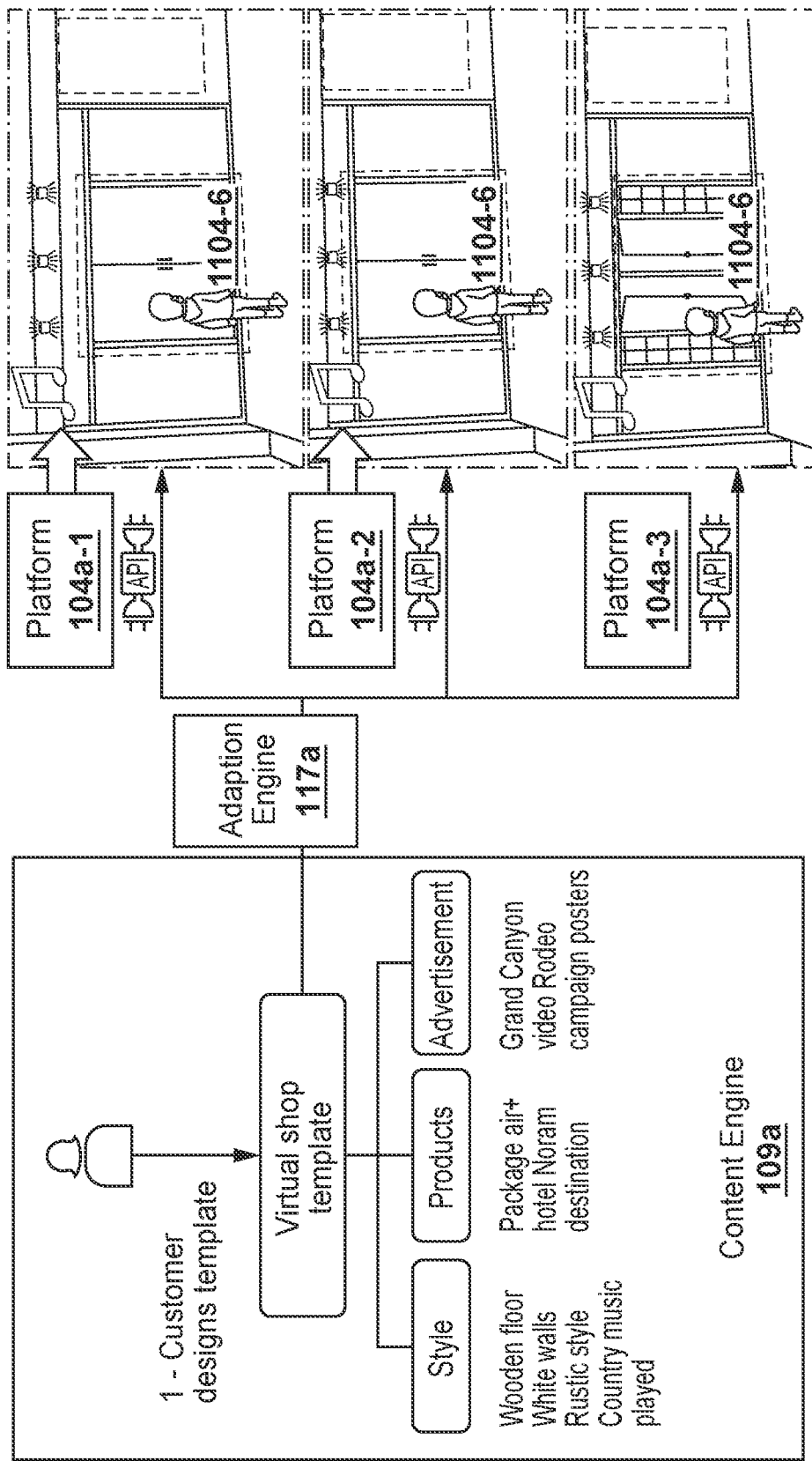
FIG. 16 shows an example of creation of a single virtual retail store model as adapted and rendered on different platforms.

FIG. 16 shows an illustrative example of how the final blocks of method 1000 may be effected, as one single model template provided at content engine 109a is received by adaptation engine 117a and then rendered on different platforms. More specifically, platform 104a-1 and platform 104a-2 are shown rendering automatic sliding doors indicated as object 1104-6; however platform 104a-3 is shown as rendering automatic swinging doors indicate as object 1104-6-S, where the suffix "S" denotes 'substitution'.

The types of substitutions at block 1016 are not particularly limited. Different types of substitution algorithms are contemplated. For example, certain platforms 104a may accommodate dynamic content for dynamic storefront object 1104-3 of FIG. 11, while other platforms 104a may only support static content. Accordingly, adaptation engine 117a can be configured to mimic dynamic content by periodically pushing a sequence of "static" updates of storefront object 1104-3, thereby creating the appearance of dynamic content for dynamic storefront object 1104-3, even though the platform 104a itself may not support such dynamic updates. In this fashion, adaptation sever 117a cooperates with the anomalous platform 104a so that all platforms 104a provide substantially the same experience to a given client device 120a.

The types of substitutions at block 1016 can, in addition or in lieu of the foregoing, comprise one or more of: changing an object to an image or video of the object in the corresponding object; changing a color of the given object to a respective color allowed by the criteria; changing the color of the given object to the respective color allowed by the criteria, the respective color allowed by the criteria selected to reduce a difference between the color and the respective color; changing three-dimensional content of the given object to two-dimensional content of the corresponding object; changing at least one of shape and configuration of the object; changing dynamic content of the given object to static content of the corresponding object; changing a rounded or curved object for a blocked object (such as in Minecraft which is built in blocks); changing a customized "skin" (such as an uploaded floor or wall pattern provided at block 1004) for a predefined "skin" (such as one of predefined floor or wall patterns that are constrained to a given metaverse platform 104a).

The substitution algorithms at block 1016 may also be developed using machine learning, neural network or artificial intelligence algorithms. Continuing with the example of sliding door object 1104-6, a machine learning algorithm can monitor a human making such substitutions to satisfy the criteria of the API of platform 104a-3. After a sufficient number of substitutions, the machine learning algorithm in adaptation server 117a can make substitutions of the slide door object 1104-6-S for platform 104a-3 while learning to retain the sliding door object 1104-6 for platform 104a-1 and platform 104a-2. As another example, a customized "skin" that is uploaded at block 1004 may be substituted with a predefined "skin" at block 1016, and thus a machine learning algorithm can monitor a number of manual substitutions of customized "skins" at block 1016 that lead the machine learning algorithm to automatically, in the future, choose certain predefined "skins" as substitutes for a given uploaded customized "skin". A person of skill in the art will now appreciate how this use of machine learning can be massively scaled for developing other substitutions for other objects, as needed, at block 1016. Thus, in addition to, or in lieu of, a table such as matrix 1500, such machine learning algorithms can be implanted. Furthermore, matrix 1500, itself, can be built entirely or in part using machine learning.

A person of skill in the art will now appreciate that the components of model template 1100-1 are illustrative examples only and that variations to the foregoing are contemplated.

Figure 17:
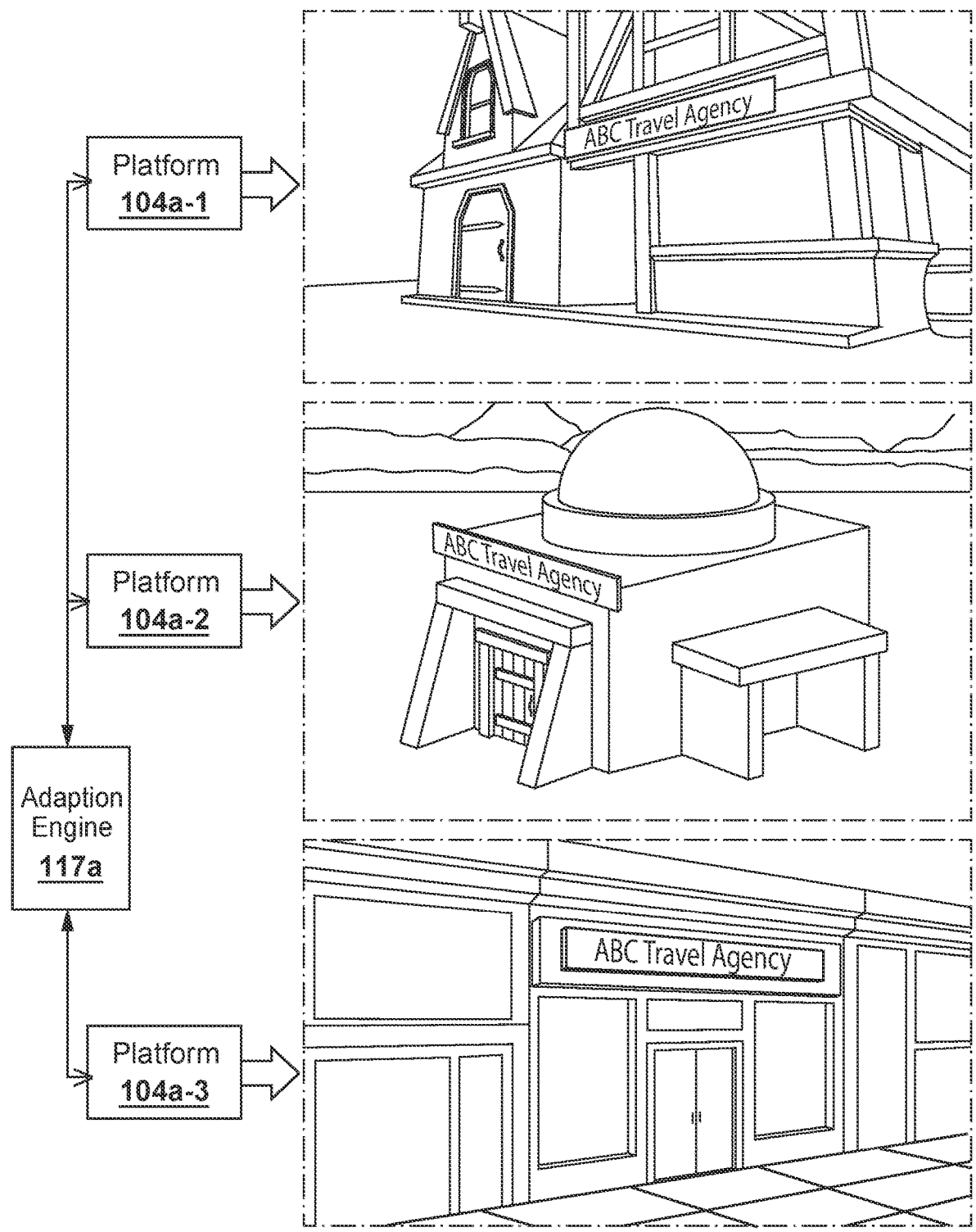
FIG. 17 shows another example of creation of a single virtual retail store model as adapted and rendered on different platforms.

FIG. 17 shows a further illustrative example of how the final blocks of method 1000 can be implemented, as another single model template provided at content engine 109a is received by adaptation engine 117a and then rendered on different platforms 104a-2. In FIG. 17, none of the platforms 104a are able to render according to the model template according to FIG. 11. Instead, the building object is abstracted out to a two story building, with a front entrance, but rendered on each platform 104*a* with an appearance that is consistent with the narrative of the platform 104*a*. Platform 104*a*-1 is shown rendering a medieval store front at high resolution; platform 104*a*-2 is shown rendering a space-opera store front in medium resolution; and platform 104*a*-3 is shown rendering a main-street building store front in low resolution. The substitutions that result in the transformations in FIG. 11 all occur at adaptation engine 117*a* based on the single received model parameters from block 1004. Notably, however, the logo signage object 1104-2, reads "ABC Travel Agency" and has not been substituted according to the example. The interior renderings of FIG. 12, FIG. 13 and FIG. 14 can likewise be modified to correspond with the narrative and functionality of the respective platform 104*a* upon which it is rendered.

Figure 18:
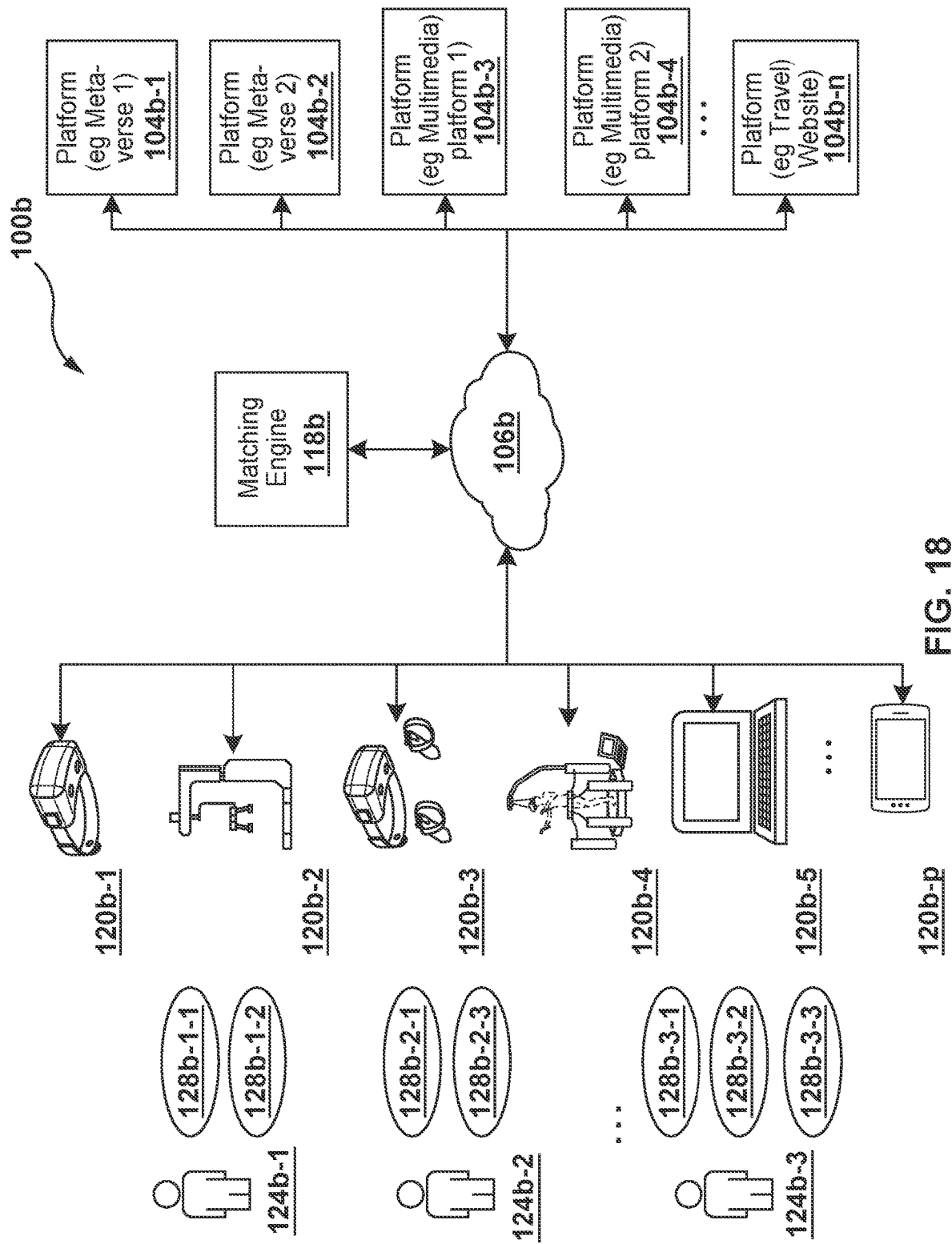
FIG. 18 is a schematic diagram of a system for cross platform account unification.

Referring now to FIG. 18, in accordance with another embodiment, a system for cross platform account identification and unification is indicated generally at 100*b*. System 100*b* is a variant on system 100 and system 100*a*, and thus like elements bear like references, except followed by the suffix "b". Network 106*b*, devices 120*b* and platforms 104*b* are substantially the same as their counterparts in system 100 and system 100*a*, although they may be varied somewhat as the context requires from the following discussion. However, it is to be noted that content engines 108, aggregation engine 112 and adaptation engine 116 are omitted from system 100*b*. (However, it is to be understood that combinations of system 100, system 100*a* and/or system 100*b*, either as variations or subsets of each other, are contemplated.) It is also to be noted that system 100*b* includes a new element in the form of a matching engine 118*b*. (When system 100*b* is combined with system 100 or system 100*a*, matching engine 118*b* can be incorporated into aggregation engine 116 and/or aggregation engine 116*a*).

Also of note, system 100*b* also expressly shows a plurality of example users 124*b*, although such users 124*b* are implicitly present in system 100 and system 100*a*. System 100*b* also expressly shows a plurality of example accounts 128*b* that are associated each user 124*b*. Again, the plurality of such accounts 128*b* are implicitly present in system 100 and system 100*a*. While only three example users 124*b* are identified in FIG. 18, each with a limited number of accounts 128*b*, a person of skill in the art will appreciate with this specification how these are examples can be massively scaled to accommodate large numbers of different users 124*b* and accounts 128*b*.

To elaborate on the example set of users 124*b* in FIG. 18:
a) user 124*b*-1 is associated with a plurality of accounts 128*b*-1;
b) user 124*b*-2 is associated with a plurality of accounts 128*b*-2; and
c) user 124*b*-3 is associated with a plurality of accounts 128*b*-3.

To elaborate on the example set of accounts 128*b* in FIG. 18:
a) example user 124*b*-1 is shown as having two accounts, namely:
   a. account 128*b*-1-1 which refers to the user account associated with platform 104*b*-1; and
   b. account 128*b*-1-2 which refers to the user account associated with platform 104*b*-2.
b) example user 124*b*-2 is shown as having two accounts, namely:
   a. account 128*b*-2-1 which refers to the user account associated with platform 104*b*-1;
   b. account 128*b*-2-3 which refers to the user account associated with platform 104*b*-3.
c) example user 124*b*-3 is shown as having three accounts, namely:
   a. account 128*b*-3-1 which refers to the user account associated with platform 104*b*-1;
   b. account 128*b*-3-2 which refers to the user account associated with platform 104*b*-2; and,
   c. account 128*b*-3-3 which refers to the user account associated with platform 104*b*-3.

The nomenclature for the reference characters for users 124*b* is the same as the other reference character nomenclatures used for other elements in system 100, system 100*a* and system 100*b*. The nomenclature for the reference characters for the accounts 128*b* follows the same logic according to the format "128*b*-X-Y" for the account and the format "124*b*-X" for the user and the format "104*b*-Y" for the platform. The variable "X" corresponds to the user number, and the variable "Y" corresponds to the platform number. These nomenclatures are specifically explained so that certain examples can be discussed below to assist in understanding how to implement system 100*b* as a whole.

Thus, users 124*b* can each access any platform 104*b* for which they have an account using any of the client devices 120*b*. No particular pairing between a given device 120*b* and a given account 128*b* is required, subject to any hardware requirements of a given platform 104*b*.

Matching engine 118*b* can be based on the same hardware infrastructure as aggregation engine 116 and, where system 100*b* is incorporated into system 100 and/or system 100*a*, then matching engine 118*b* can be integrated into either aggregation engine 116 and/or aggregation engine 116*b*. As will be explained in greater detail below, matching engine 118*b* is generally configured to interact with platforms 104*b*, devices 120*b* and accounts 128*b* to generate a unified account identifier for each user 124*b*.

Figure 19:
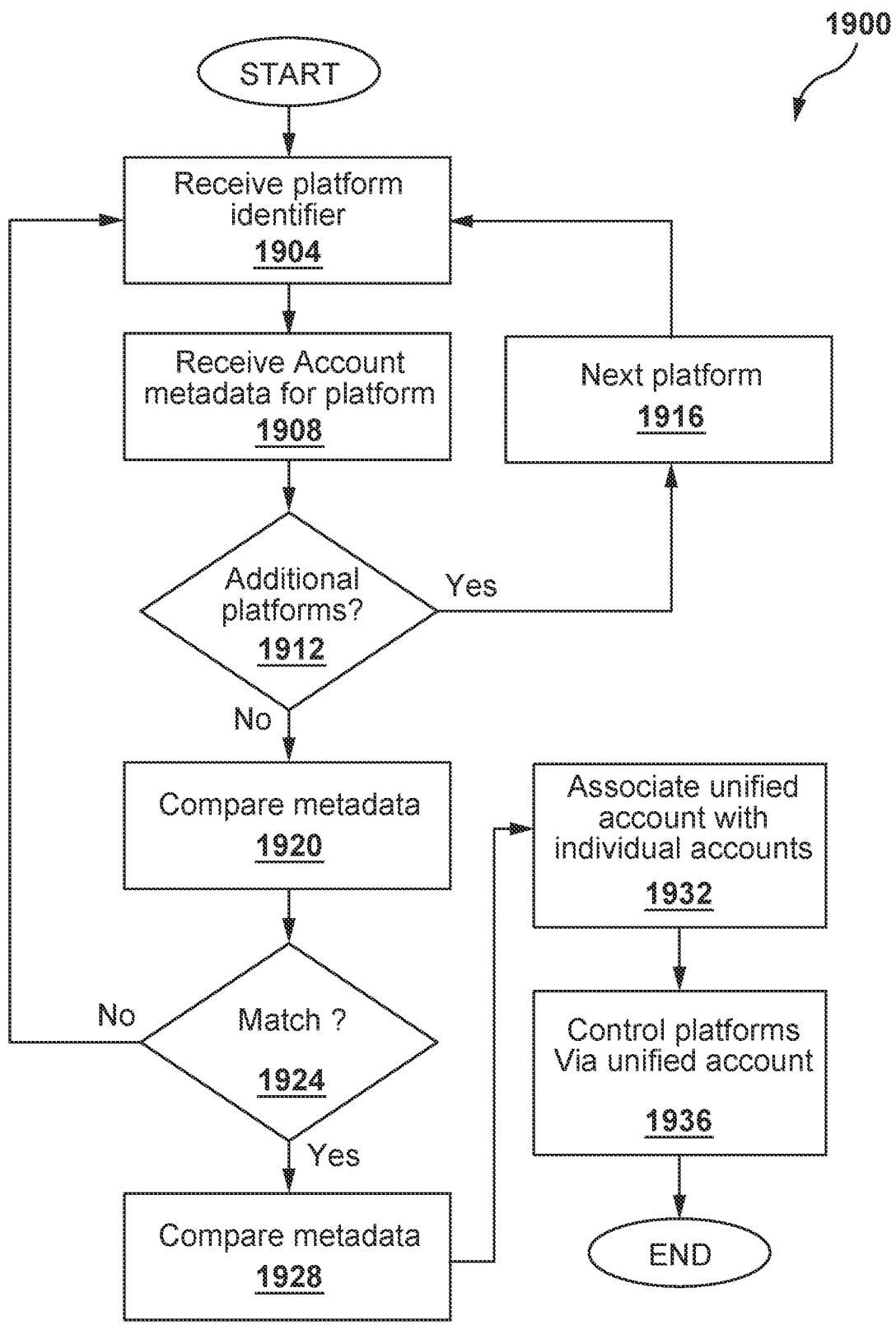
FIG. 19 shows a flowchart depicting cross platform account unification.

FIG. 19 shows a flowchart depicting a method for cross platform account identification and unification indicated generally at 1900. Method 1900 can be implemented on system 100*b*. Persons skilled in the art may choose to implement method 1900 on system 100*b* or variants thereon, (such as in combination with system 100 and/or system 100*a*), or with certain blocks omitted, performed in parallel or in a different order than shown. Method 1900 can thus also be varied. However, for purposes of explanation, method 1900 as per the flow chart of FIG. 19 will be described in relation to its performance on system 100*b* with a specific focus on matching engine 118*b* and its interactions with the other nodes in system 100*b*.

Block 1904 comprises receiving a platform identifier. In accordance with system 1900*b*, block 1904 is performed by matching engine 118*b* which is generally aware of the existence of and network addresses of platforms 104*b*. In accordance with a specific illustrative example, block 1904 begins with platform 104*b*-1. Block 1904 can occur in real-time or can occur asynchronously or "off-line", in that the platform identifiers can be received, stored and maintained at matching engine 118*b* at any time.

Block 1908 comprises receiving account metadata for the platform identified at block 1904. Block 1908 thus contemplates receiving metadata associated with one or more users 124*b* respective to the platform(s) 104*b* identified at block 1904. In accordance with the present illustrative example, a limited discussion will focus on user 124*b*-1 and the associated accounts 128*b*-1, but a person of skill in the art will come to appreciate how method 1900 can scale to all users 124*b* and all platforms 104*b*. However, continuing with the illustrative example, since the identified platform at block 1904 is platform 104b-1, then at block 1908, account metadata associated with account 128b-1-1 will be received at block 1908.

Account metadata can be any type of identifying data including information and/or activities that are associated with the relevant account 128b. It is contemplated that, in a presently preferred embodiment, account metadata can include deterministic data and probabilistic data.

Deterministic data can include personally identifiable information (PII) such as name, email address, session connection identifiers, social media handles (e.g. for Twitter, Instagram, etc.), non-fungible token (NFT) identifiers, photographs, avatar skins and artwork, travel record locators, geo-location, phone numbers, social insurance numbers, credit card numbers, bank account numbers, home addresses, hardware media access control (MAC) identifiers, International Mobile Equipment Identity (IMEI) numbers, and static IP addresses. In general, such deterministic data include unique identifiers that are provided to the platform 104b in association with the account 128b for the platform 104b, and may be derived from the relevant client device 120b. For example, when provisioning account 128b-1-1 on platform 104b-1, user 124b-1 may be required, or optionally requested, to provide deterministic data in association with that account 128b-1-1. Alternatively, or in addition, deterministic data may be inferred, such as geo-location information derived from the relevant client device 120b. Alternatively, or in addition, the deterministic data may be generated, such as a travel record locator that may be generated during a transaction involving the purchase of a travel service on a given platform 104b. In the example of NFTs, an NFT may be owned by a given user 124b and associated with the relevant account 128b. One can envision, for example, a platform 104b requiring a metaverse avatar, and an NFT of an original piece of artwork for an article of clothing that may be provided as part of the artwork for the avatar.

Probabilistic data can include information that can be used to infer a likelihood of association between the ultimate identity of a given user 124b and a given account 128b. Probabilistic data can include lists of hobbies, interests and friend connections. For example, when provisioning account 128b-1-1 on platform 104b-1, user 124b-1 may be required, or optionally requested, to provide probabilistic data in the form of a list of interests, hobbies and friend connections.

Probabilistic data can also include behavioural patterns, such as a "walk pattern" of how a given avatar is typically navigated by a given user 124b based on user inputs provided at the associated client device 120b. Further probabilistic data can include use of language and dialect, moods and behaviours, associations with groups, online purchasing patterns, avatar clothing styles, use of emojis or other reactions to events, and other behavioural patterns.

It is to be understood that context may dictate whether account metadata is deemed to be probabilistic or deterministic. For example, a MAC address for a given device 120b that is associated with many different logins from different accounts 128b may be better viewed as a probabilistic data identifier, whereas a MAC address that is constantly associated over long period of time with the same account 128b with a static geo-location may be inferred to be a deterministic data identifier.

It is to be understood that method 1900 can be adapted to accommodate appropriate legal and ethical limitations to the access of personally identifiable information. Indeed, one of the advantages of the present invention can be the ability to generate a unified account that may respect the privacy of a given user 124b. At the same time, the unified account may still permit the control of various platforms 104b to include the delivery of targeted content towards that given user 124b, whose privacy is maintained. However, maintaining such privacy is not necessarily required in all implementations of system 100b as in certain contexts a given user 124b may provide express authorization for the identity of that user 124b to be disclosed.

At block 1912, a determination is made as to whether there are any further platforms to examine. It is presently preferred that a least two different platforms 104b are examined and accordingly at block 1912 a yes determination is reached leading to block 1916 which advances to the next platform. According to the specific example, the next platform identifier is platform 104b-2.

Block 1904 and block 1908 are thus repeat again, but this time for platform 104b-2. Thus, metadata for platform 104b-2 is received at block 1908, and accordingly, metadata associated with account 128b-1-2 is received at block 1908.

The loop defined by block 1904, block 1908, block 1912 and block 1916 can thus repeat for every platform 104b in system 100b. It is to be understood that method 1900 can be massively scaled to collect metadata for each account 128b for each user 124b for each platform 104b. To be clear, the simple loop in method 1900 is illustrative and, particularly as system 100b scales, more complex programming techniques can be employed whereby, for example, certain blocks occur asynchronously, or via multi-threading, parallel processing or other techniques. The loop can also run continuously, constantly refreshing data across system 100b according to changes in platforms 104b, accounts 128b, client devices 120b and users 124b. However, in accordance with our simplified illustrative example, user 124b-1 only has two accounts 128b-1 and thus the loop can exit and method 1900 can advance to block 1920.

Figure 20:
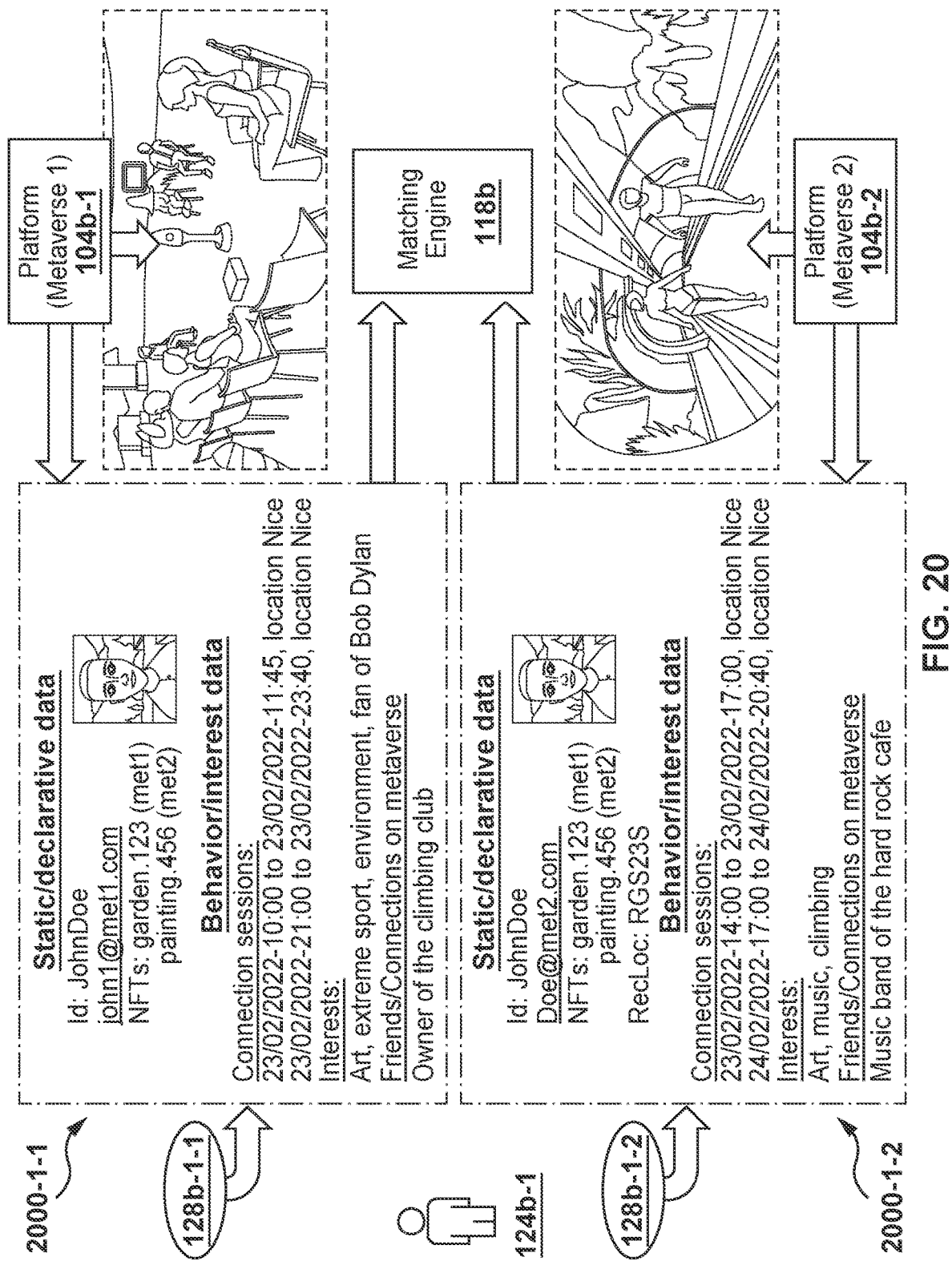
FIG. 20 shows an example of account metadata for two of the platform accounts for a single user.

FIG. 20 thus shows an example of the state of non-volatile storage of matching engine 118b for our simplified example just prior to commencement of block 1920. In FIG. 20, a first account metadata record 2000-1-1 is associated with account 128b-1-1 and a second account metadata record 2000-1-2 is associated with account 128b-1-2. Account metadata records 2000 thus include identifying data in the form of static or declarative data in the form of login IDs, email addresses, NFTs, as well as behavioural or interest data in the form of connection session login times, interests and friend connections within the relevant platform 104b. Metadata records 2000 thus include the metadata shared by the platform 104b (profile ID, email address, hobby, etc.) and can also include inferred behavioural characteristics. As noted, behavioural characteristics can include "walking behaviour" within the metaverse, purchase history, groups of friends and the like. Note that behavioural characteristics can be captured by matching engine 118b, or by platforms 104b. Behavioural characteristics and can also include inferred behavioural characteristics captured by adaptation engine 117a or adaptation engine 116 which were not explicitly provided by the platform 104b. FIG. 20 shows representations of metadata records 2000 being received from their respective platforms 104b at matching engine 118b.

Figure 21:
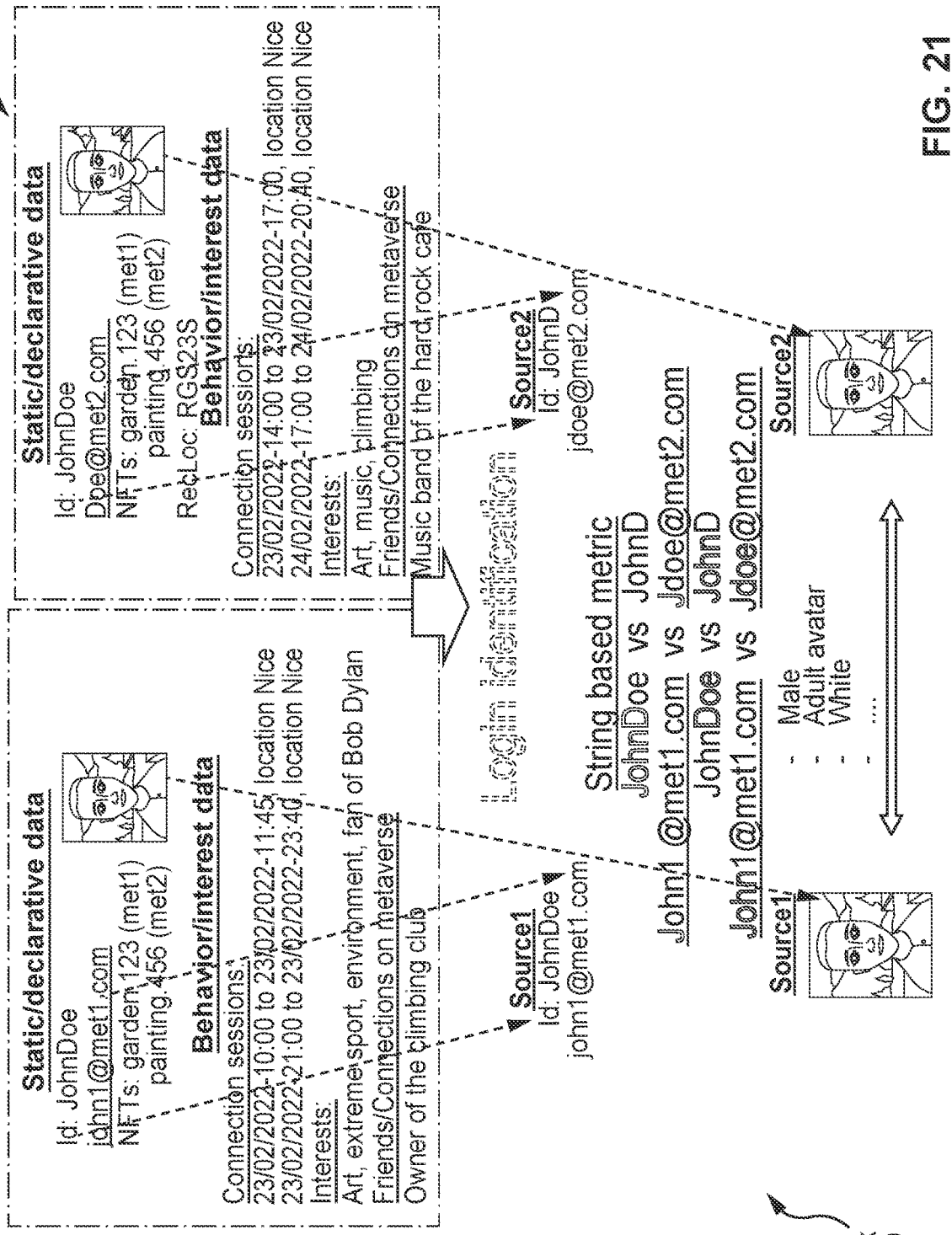
FIG. 21 shows an example of the comparing function from the method of FIG. 19.

Returning again to FIG. 19, block 1920 comprises comparing the account metadata collected at block 1908. Example performance of block 1920 according to our specific example is shown in FIG. 21. FIG. 21 shows fields from metadata records 2000-1 being directly associated and compared. Specifically the loginid "JohnDoe" from record 2000-1-1 has a string comparison made against the loginid "JohnD" from metadata record 2000-1-2, leading to a first probabilistic indication that metadata records 2000-1 are associated with the same user 124*b*. Additional indications include a potential alignment between the email address "john1@met1.com" from record 2000-1-1 and the email address "doe@met2.com" from record 2000-1-2. Additional indications include the similarity between the two profile pictures from each record 2000-1, as well as an image recognition algorithm that identifies the demographic of the subject of the profile pictures as being white and male, which are potential demographic matches with an individual of the name "John Doe".

Figure 22:
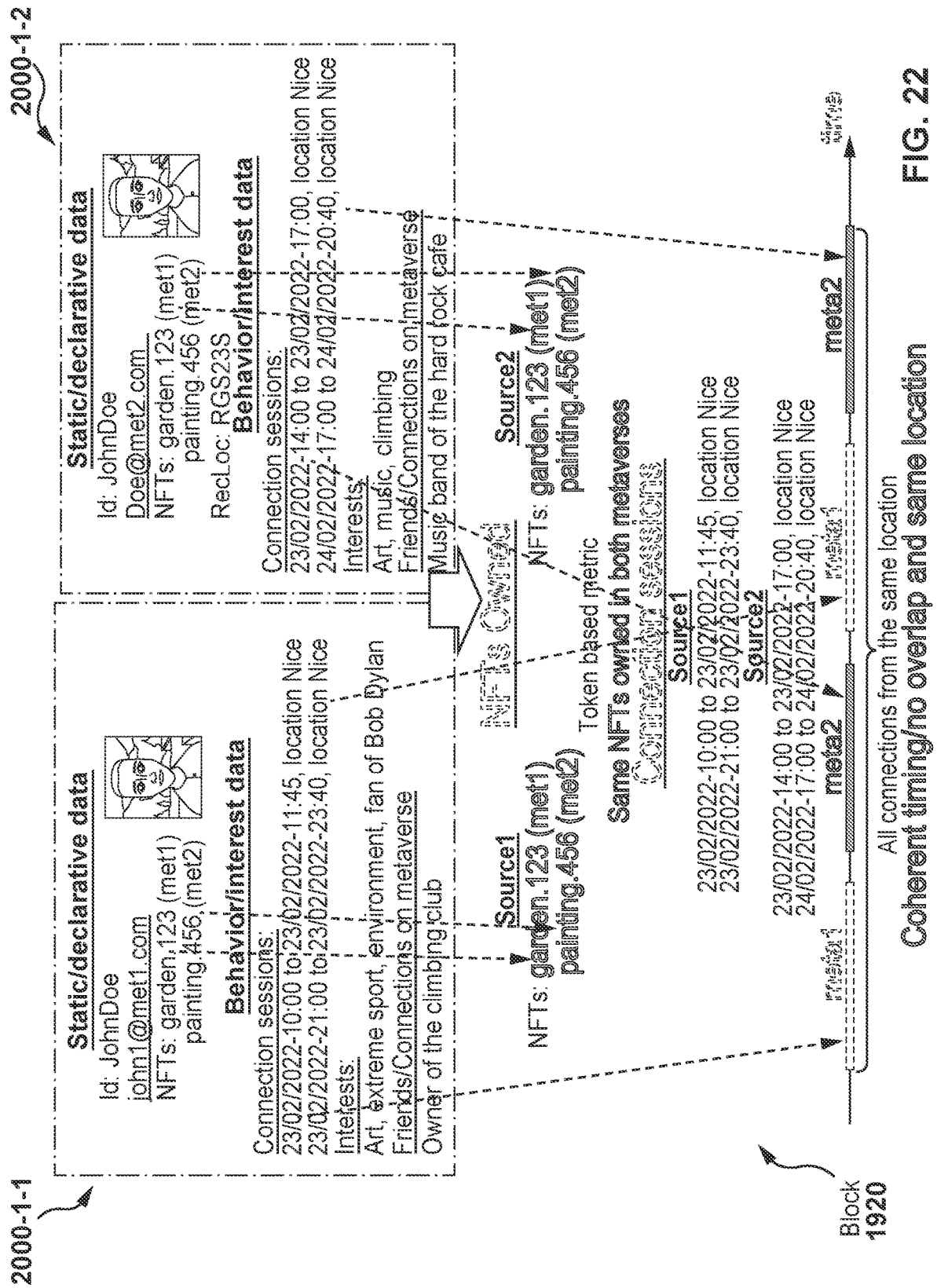
FIG. 22 shows another example of the comparing function from the method of FIG. 19.

Further example performance of block 1920 continues in FIG. 22, where additional fields from metadata records 2000-1 are directly associated and compared. Specifically, the NFT identifiers "garden. 123 (met1)" and "painting.456 (met2)" are found within both record 2000-1-1 and record 2000-1-2. Since NFTs are legally owned by a single individual, this is a strong inference that record 2000-1-1 and record 2000-1-2 have a common user 124*b*. Further comparisons between connection session times in record 2000-1-1, namely a first connection at "23/02/2022-10:00 to 23/02/2022-11:45, location Nice" and a second connection at "23/02-22-21:00 to 23/02/2022-23:40, location Nice" dovetail with the connection session times in record 2000-1-2, namely, "23/02/2022-14:00 to 23/02/2022-17:00, location Nice" and "24/02/2022-17:00 to 24/02/2022-20:40, location Nice", indicating that the same user 124*b* was alternating sessions between platform 104*b*-1 and platform 104*b*-2.

Figure 23:
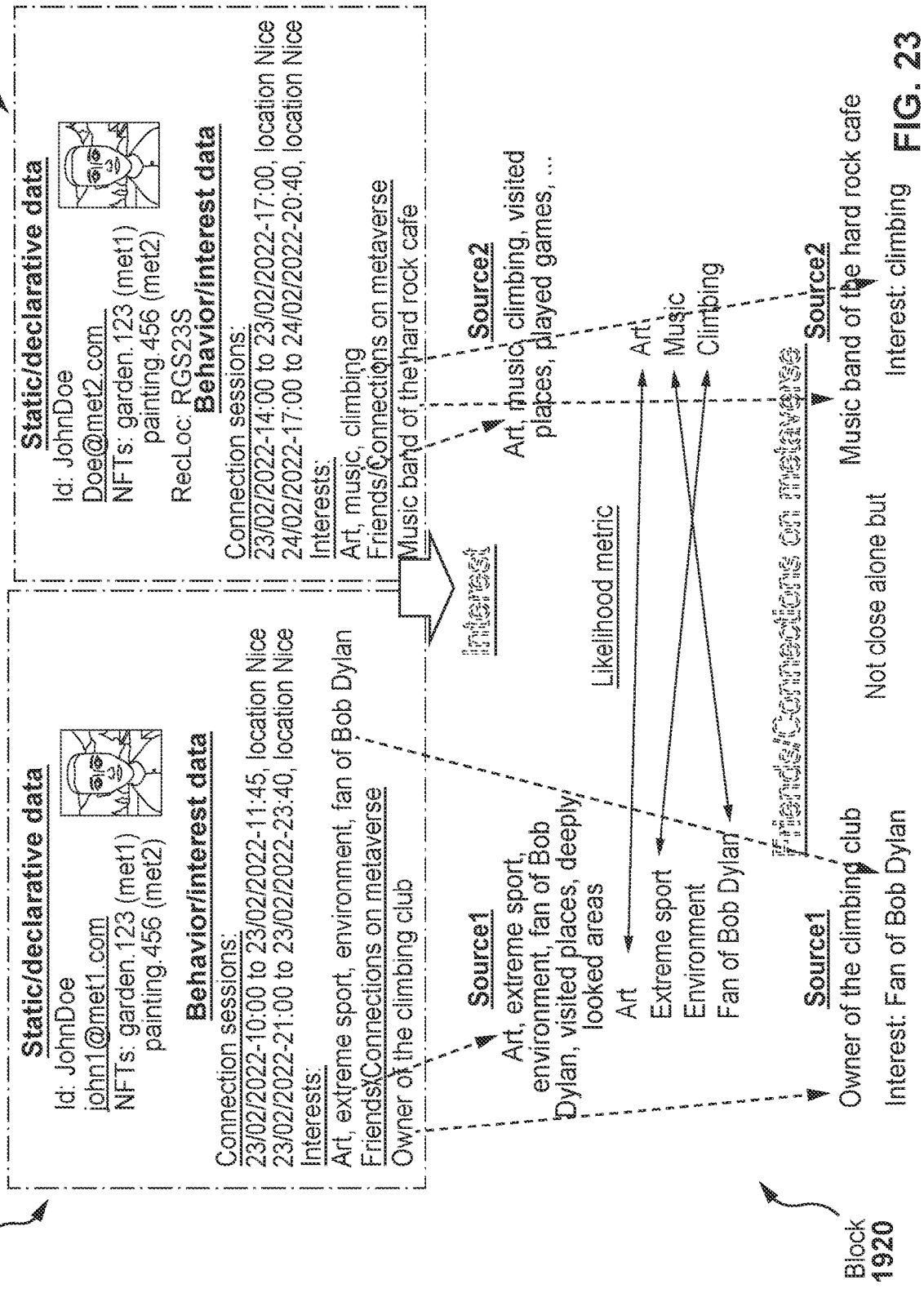
FIG. 23 shows another example of the comparing function from the method of FIG. 19.

Further example performance of block 1920 continues in FIG. 23, where still further additional fields from metadata records 2000-1 are directly associated and compared. Specifically, the self-identified interests from record 2000-1-1, namely "Art, extreme sport, environment, fan of Bob Dylan" are compared with the self-identified interests from record 2000-1-2 namely, "Art, music and climbing". While these specific lists of interests are not identical, a likelihood of association can be made between "Art" and "Art", and "Extreme sport" and "Climbing", and "Fan of Bob Dylan" and "Music". Additional comparisons are made between different elements of each record 2000-1, for example that record 2000-1-1 shows "Owner of climbing club" as a friend or connection in platform 104*b*-1, while record 2000-1-2 shows "climbing" as an interest, further indicating a match between record 2000-1-1 and record 2000-1-2, further suggesting that each record 2000-1 is associated with the same user 124*b*.

Thus, the comparisons in FIG. 21, FIG. 22 and FIG. 23 can be combined such that while each individual comparison may suggest that each record 2000-1 is associated with the same user 124*b*, the combined probabilities create an even greater indication that each record 2000-1 indeed originates from the same user 124*b*. Specifically, the combined matching score from FIG. 21, FIG. 22, and FIG. 23 suggests that user 124*b*-1 is the common holder of account 128*b*-1-1 and account 128*b*-1-2.

It should be noted that various machine learning approaches can also be applied to the comparisons made at block 1920. Such approaches can include machine learning and/or deep-learning based algorithms and/or neural networks, and the like, which are trained to improve the electronic identity verification approaches discussed herein. Furthermore, in these examples, performance of block 1920 may be operated by a processor within matching engine 118*b*, or another processor, in a training mode to train the machine learning and/or deep-learning based algorithms and/or neural networks accordance with the teachings herein.

The one or more machine-learning algorithms and/or deep learning algorithms and/or neural networks may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. To be clear, any suitable machine-learning algorithm and/or deep learning algorithm and/or neural network is within the scope of present specification.

Figure 24:
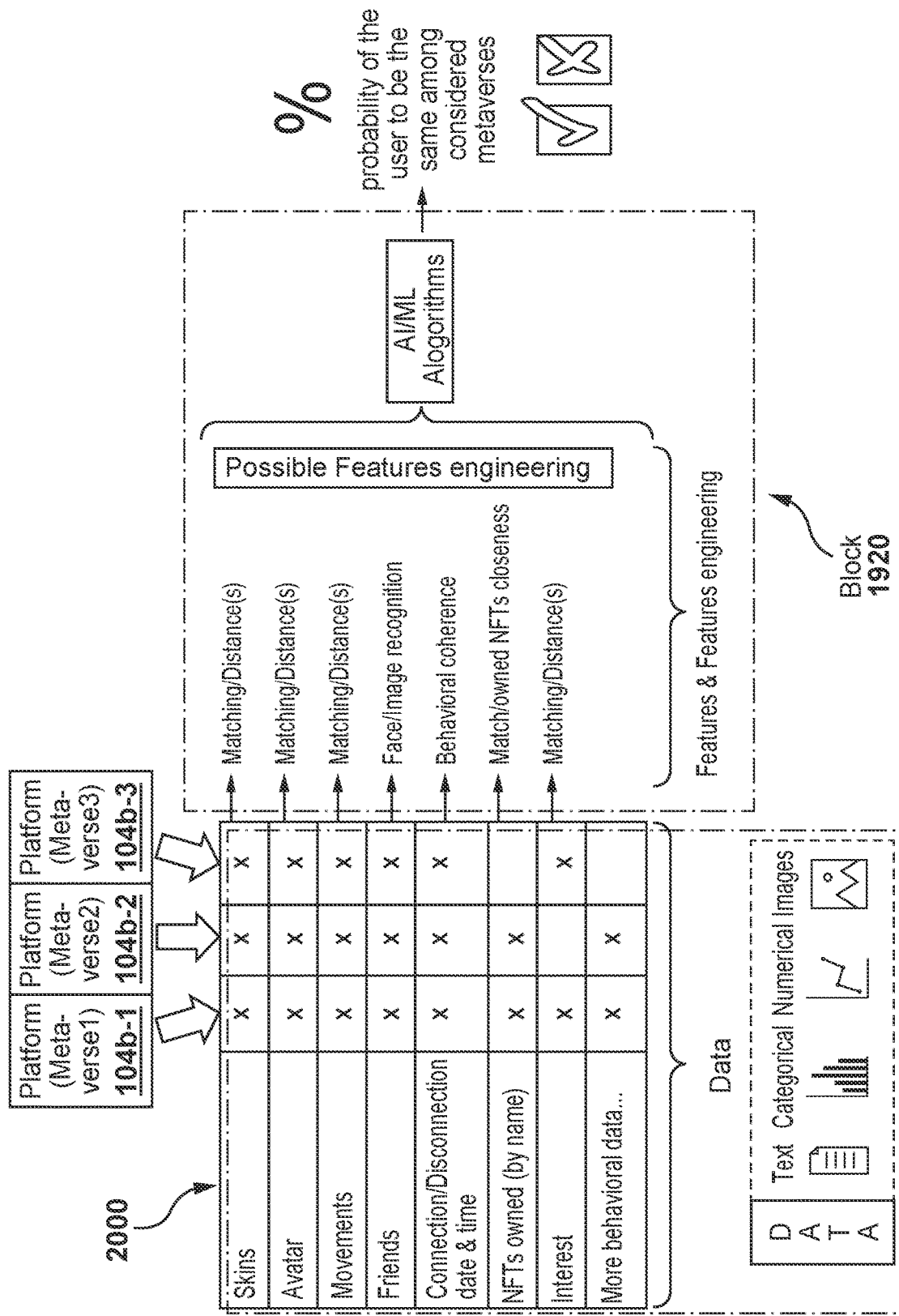
FIG. 24 shows another example of the comparing function from the method of FIG. 19 based on probabilistic determinations.

FIG. 24 shows a representation of how metadata records 2000 can be associated with a machine learning algorithm that is applied at block 1920. In FIG. 24, metadata records 2000 can include data regarding the skins, avatar, movements, friends, connection/disconnection dates and times, NFTs, interests and other behavioural data that can be textual, categorical, numerical or graphical, for each account 128*b*-X-Y across each respective platform 104*b*. Block 1920 can apply mathematical techniques, implemented in the processor of matching engine 118*b*, such as matching distances, facial recognition, behavioural coherence, all of which can be applied within a machine learning algorithm to arrive at a probability of a match across a given set of accounts 128*b* that the particular set of accounts 128*b* is associated with the same user 124*b*. The machine learning algorithms can be taught by way of human verification including expressly asking a user 124*b* to confirm the association and/or to anchor the verification for a sample set within a known absolute deterministic identifier across all accounts 128*b* such as a social security number or passport number. A sufficient number of affirmed associations of a common user 124*b* for a set of accounts 128*b* can then lead to sufficient training of the machine learning algorithm so that other performances of block 1920, where no affirmative verification exists, can still lead to an assignment of a probability of a match.

Thus, referring again to FIG. 19, at block 1924 a determination is made as to whether the comparison performed at block 1920 led to a match. A "no" determination leads method 1900 back to block 1904, or alternatively method 1900 can simply terminate. A "yes" determination at block 1924 leads to block 1928 at which point a unified account or other unique identifier is generated for assignment to the collection of accounts 128*b* that led to the match at block 1924.

The "yes" determination at block 1924 can be reached when a sufficient probability level is reached. Any human verification that a collection of accounts 128*b* that were compared at block 1920 can thus be dispositive of a confirmed "yes" determination. However, any probability threshold of a confidence interval can also lead to a "yes" determination at block 1924. The threshold, for example, can be about eighty percent, or it can be about one-hundred percent. Overall, the threshold is configurable and can be set as desired.

Block 1928 comprises generating a unified account and block 1932 comprises associating the unified account (or other unique identifier) from block 1928 with the collection of accounts 128*b* from block 1920 that led to the "yes" determination at block 1924. The unified account will thus combine all deterministic data, probabilistic data, inferred data and any other metadata from block 1908.

Again, there can be machine learning functions or feedback loops or the like incorporated into method 1900. For example, such a function can correct and learn from a prior erroneous "yes" determination at block 1924. The error may have occurred because, for example, a certain threshold level was reached during a previous iteration, even though the threshold level may not have been correct. Accordingly, a correction can be applied that adjusts the threshold level and the resulting unified account at block 1932 can be deleted or otherwise corrected.

Block 1936 comprises controlling the various platforms 104*b* based on sessions associated with the unified account. The nature of the form in which the platforms 104*b* are controlled is not particularly limited, and indeed the type of the controlling can inform the confidence probability percentage that leads to the "yes" determination at block 1920. For example, assume that system 100, system 100*a* and system 100*b* are combined into a single system. Also assume a given user 124*b* is noted to have begun the purchase of travel services on platform 104*b*-1 (where platform 104*a*-1 and platform 104*b*-1 are identical), but has not submitted payment. Accordingly, if the same user 124*b* joins platform 104*b*-2 (where platform 104*a*-2 and platform 104*b*-2 are identical) then user 124*b* can be provided with a continuation of the travel services purchase experience, being given the opportunity to complete the payment processing on platform 104*b*-2 for the travel services that were selected on platform 104*b*-1. Alternatively, instead of simply assuming there was a match at block 1924, an additional authentication step can be provided urging the user 124*b* to return to platform 104*b*-1 and enter a code generated on platform 104*b*-2 that will positively confirm the match. (In other words, user 124*b* can be asked to directly affirm the "yes" determination at block 1924.) In this example, the "yes" determination at block 1924 will be based on a threshold of one-hundred-percent.

As another example, once again assume that system 100, system 100*a* and system 100*b* are combined. If only a fifty-percent (or some other threshold well less than one-hundred-percent) probability of a match was made at block 1924, then a detection that a given user 124*b*-3 has transitioned from platform 104*b*-1 to platform 104*b*-2 may include controlling platform 104*b*-2 to continue to show content that is deemed relevant to user 124*b*-3 based on activity that was occurring on platform 104*b*-1. To elaborate, if user 124*b*-3 was detected as browsing for Caribbean cruises on platform 104*b*-1, then a detection of user 124*b*-3 on platform 104*b*-2 could lead to the generation of virtual advertisements within the metaverse of platform 104*b*-2 for Caribbean cruises. A failure to have made a completely accurate match at block 1924 will not lead to any serious consequences.

As another example of block 1936, assume that in system 100*b* (or a combination of system 100 and/or 100*a*) a functionality is provided to "teleport" from one platform 104*b*-1 to anther platform 104*b*-2. The unified account from block 1932 can be used to automatically authenticate a given user 124*b* across each platform 104*b*, thereby facilitating the seamless "teleportation" function.

In summary, the present specification provides a multi-platform virtual retail store engine. The specification can have application to client devices with augmented or virtual reality hardware that interact with different platforms with different metaverse capabilities. Rich experiences are provided on client hardware while making efficient use of available processing, memory and communication resources. Embodiments discuss the provision of a single retail store model which is dynamically adapted for generation across the plurality of different platforms according to the different metaverse capabilities. Embodiments also discuss include racking of the same user across different accounts on different metaverse platforms.

A person skilled in the art will now appreciate that the teachings herein can improve the technological efficiency and computational and communication resource utilization across system 100, system 100*a* and system 100*b* and combinations of them. These efficiencies scale and become more desirable as the range of available hardware input and output devices for client devices expand and as metaverse and multimedia platform environments create additional contexts for the delivery of services such as travel agency services. The richness of experience combined with the convenience for users creates the opportunity for greater expectation management as to what travel services are being acquired. At the same time the sheer diversity of client devices and platforms creates a pull in the opposite direction, as there is a need to ensure that travel asset inventories (such as which airline seats, hotel rooms, restaurant booking times, have been sold and which remain open) are constantly updated in real time so that accurate inventory choices are being generated at the time a session for selection of such inventory is occurring between any given client machine and any given platform. Tracking of the same users across different devices and platforms leads to further system efficiencies. The filtering of unneeded content for less capable client machines also reduces network resource stress on the network, by only delivering the content that can be utilized by the given client device. Furthermore, individual retailers such as travel agencies can develop a consistent presence across several platforms using a single interface via a single adaptation engine, thereby reducing the multiplicity of efforts required for a single retail travel agency to build and update separate presences across several different platforms. The result is efficient use of computing resources, including processing, memory and communication resources, across system 100 and its variants, while providing as rich an experience as possible according to the resource capabilities of the client devices 120 and the platforms 104. Furthermore, by inferring or identifying common users across different platforms, those platforms can be controlled to, for example, generate content that is relevant to those users. In so doing, network communication resources on the network are used efficiently, by avoiding the generation of content that will not lead to further interactions from a user operating a given client device.

In view of the above it will now be apparent that variants are contemplated. For example, the foregoing has been discussed in relation to the travel industry, it will now be understood that the above-described embodiments can be modified to other industries. For example, an online e-commerce environment such as Amazon™ that becomes enhanced through virtual reality metaverse offerings can be enhanced using the teachings herein. Example additional industries include vehicle purchases from dealerships, medical services from medical clinics, and real estate services from real estate agencies.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A matching engine comprising:
a network interface; and
a processor configured to:
compare first metaverse metadata associated with a first account of a first metaverse and second metaverse metadata associated with a second account of a second metaverse;
the first metaverse metadata comprising at least one of: first user data; first connection times that a first metaverse human-machine interface (HMI) associated with the first user connected to the first metaverse; first disconnection times that a first metaverse HMI associated with the first user disconnected from the first metaverse and time duration of activity by the first user with respect to the first metaverse;
the second metaverse metadata comprising at least one of: second user data; second connection times that a second metaverse HMI associated with the second user was connected to the second metaverse;
in response to comparing, from the first metaverse metadata and the second metaverse metadata, that the first user and the second user is a same user:
when the first metaverse HMI is connected to the first metaverse, adapt, via the network interface, first behavior of the first metaverse based on the second metaverse metadata to control first physical feedback of the first metaverse HMI to indicate the first behavior;
when the first metaverse HMI is connected to the second metaverse, adapt, via the network interface, second behavior of the second metaverse based on the first metaverse metadata, to control second physical feedback of the second metaverse HMI to indicate the second behavior,
wherein the processor is further configured to determine, from the first metaverse metadata and the second metaverse metadata, that the first user and the second user is the same user by:
determining that a probability that the first user data and the second user data are associated;
determining that the probability meets a threshold condition; and
determining that the first connection times and the second connection times are different from one another.

2. The matching engine of claim 1,
wherein the processor is further configured to:
determine that the first connection times and the second connection times at least partially overlap; and, in response,
electronically initiate a corrective action.

3. The matching engine of claim 1,
wherein the processor is further configured to:
in response to determining that the same user is logged into the first metaverse using first metaverse credentials and teleports to the second metaverse using second metaverse credentials, provide the first user data to the second metaverse; and
in response to determining that the same user is logged into the second metaverse using the second metaverse credentials and teleports to the first metaverse using the first metaverse credentials, provide the second user data to the first metaverse.

4. A method for cross platform account unification comprising:
receiving an identifier for each of a plurality of platforms; at least one of the platforms configured to generate an interactive metaverse;
receiving metadata for at least one user account for each of the platforms;
comparing the metadata for each of the accounts;
determining that at least two of the accounts match with a single user;
associating the at least two of the accounts with a unified account; and,
controlling at least one of the platforms based on the unified account,
wherein the match is based on a probability threshold.

5. The method of claim 4, wherein the probability threshold is derived from a machine learning algorithm that receives positive confirmation from a plurality of the single users of a correct match and then applies the probability threshold to additional single users without positive confirmation.

6. The method of claim 4, wherein if the probability threshold is less than one hundred percent the controlling is limited to generating interactive metaverse advertisements.

7. The method of claim 4,
wherein the controlling comprises generating an interactive metaverse advertisement on one of the platforms directed the single user based on actions performed by the single user in another one of the platforms.

8. The method of claim 4,
wherein the controlling comprises providing travel services including a single travel sales transaction of one or more of marketing, sales, travel option selections across two of the platforms.

* * * * *